United States Patent
Liu

(10) Patent No.: US 12,399,841 B2
(45) Date of Patent: Aug. 26, 2025

(54) MEMORY PROTECTION METHOD AND PROTECTION PROXY CONTROL APPARATUS

(71) Applicant: HUAWEI TECHNOLOGIES CO., LTD., Guangdong (CN)

(72) Inventor: Junlong Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 129 days.

(21) Appl. No.: 18/162,114

(22) Filed: Jan. 31, 2023

(65) Prior Publication Data
US 2023/0176984 A1    Jun. 8, 2023

Related U.S. Application Data

(63) Continuation of application No. PCT/CN2020/106451, filed on Jul. 31, 2020.

(51) Int. Cl.
G06F 12/14    (2006.01)
G06F 12/1045    (2016.01)

(52) U.S. Cl.
CPC ...... G06F 12/1458 (2013.01); G06F 12/1054 (2013.01); G06F 12/1441 (2013.01)

(58) Field of Classification Search
CPC ....... G06F 12/14–1491; G06F 12/1054; G06F 3/06; Y02D 10/00
See application file for complete search history.

(56) References Cited

U.S. PATENT DOCUMENTS

| | | | | |
|---|---|---|---|---|
| 2013/0013889 | A1* | 1/2013 | Devaraj | G06F 12/109 711/207 |
| 2014/0201481 | A1* | 7/2014 | Marulkar | G06F 21/80 711/163 |
| 2016/0085687 | A1* | 3/2016 | Baruch | G06F 12/1009 711/147 |
| 2018/0267726 | A1 | 9/2018 | Sun et al. | |

(Continued)

FOREIGN PATENT DOCUMENTS

| | | |
|---|---|---|
| CN | 101090401 A | 12/2007 |
| CN | 106502926 A | 3/2017 |
| CN | 109739806 A | 5/2019 |

(Continued)

OTHER PUBLICATIONS

Extended European Search Report in European Appln No. 20946738.0, dated Aug. 3, 2023, 8 pages.

(Continued)

*Primary Examiner* — Khoa D Doan
(74) *Attorney, Agent, or Firm* — Fish & Richardson P.C.

(57) ABSTRACT

This application discloses a memory protection method and a protection proxy control apparatus. In an example method, in response to determining that an accelerator or an input/output (I/O) device requests to access a system memory by using a direct physical address, the protection proxy control apparatus may obtain, based on an identifier of a data stream of the accelerator or the I/O device, permission information of a physical page table in which a physical address requested to be accessed by the data stream is located, and perform permission check on the memory access request based on the permission information.

20 Claims, 15 Drawing Sheets

(56) References Cited

U.S. PATENT DOCUMENTS

2019/0018800 A1* 1/2019 Jayasena ............. G06F 9/45558
2020/0019515 A1* 1/2020 Koufaty ............. G06F 12/1483

FOREIGN PATENT DOCUMENTS

CN         111124814 A    5/2020
CN         111291079 A    6/2020

OTHER PUBLICATIONS

International Search Report and Written Opinion in International Appln. No. PCT/CN2020/106451, mailed on Apr. 27, 2021, 17 pages (with English translation).

* cited by examiner

MEMORY PROTECTION METHOD AND PROTECTION PROXY CONTROL APPARATUS

CROSS-REFERENCE TO RELATED APPLICATIONS

This application is a continuation of International Application No. PCT/CN2020/106451, filed on Jul. 31, 2020, the disclosure of which is hereby incorporated by reference in its entirety.

TECHNICAL FIELD

This application relates to the field of computer processing technologies, and in particular, to a memory protection method and a protection proxy control apparatus.

BACKGROUND

In recent years, hardware accelerators (accelerator) have been widely used. The accelerators may be more closely combined with a central processing unit (CPU) in logic by using some interface technologies. For example, in a heterogeneous system architecture (HSA), a shared virtual memory (SVM) technology is used, so that an accelerator and a CPU may share virtual address space and a cache. This implements consistency of software programming.

However, these interface technologies not only improve performance and reduce power consumption, but also bring serious security and isolation risks. Especially when an accelerator or an input-output (IO) device is designed and manufactured by a third-party manufacturer, if the accelerator or the I/O device is allowed to directly access a system memory at a physical address, the system memory may be exposed to a large quantity of risks. For example, if physical address space with no read permission is accessed, confidentiality of the system memory is threatened. If physical address space with no write permission is accessed, correctness of the system memory is threatened.

Therefore, in the conventional technology, there is a trust zone mechanism in an ARM architecture. In the mechanism, system resources of software and hardware are divided into two parts: a secure world and a normal world. In this way, an insecure accelerator/I/O device is prevented from accessing a system memory that belongs to an operating system (OS). In this mechanism, processes in the normal world can access only system resources in the normal world, and processes in the secure world can access system resources in the normal world and system resources in the secure world. System resources are divided into only two parts, that is, the secure world and the normal world, a protection granularity of the mechanism for the system memory is coarse, and the mechanism cannot provide effective protection for processes that belong to the normal world.

SUMMARY

This application provides a memory protection method and a protection proxy control apparatus, to check a memory access permission when an accelerator or an I/O device directly uses a physical address to access a system memory. Therefore, security of the system memory is effectively ensured.

According to a first aspect, this application provides a memory protection method, where the method may be performed by a protection proxy control apparatus, and the method includes: receiving a memory access request from an accelerator or an input/output I/O device, where the memory access request includes an identifier of a data stream of the accelerator or the I/O device and a first physical address requested to be accessed; reading, based on the identifier of the data stream of the accelerator or the I/O device, permission information corresponding to a first physical page table in which the first physical address is located, where the permission information corresponding to the first physical page table indicates whether the data stream has a read permission and/or a write permission in the first physical page table; and performing a permission check on the memory access request based on the permission information corresponding to the first physical page table, and if the permission check succeeds, allowing the memory access request to access the first physical address.

According to the foregoing technical solution, when the accelerator or the I/O device requests a direct physical address to access a system memory, the protection proxy control apparatus may obtain, based on the identifier of the data stream of the accelerator or the I/O device, permission information of the first physical page table in which the first physical address requested to be accessed by the data stream is located. In addition, permission check is performed on the memory access request based on the permission information, and direct physical address access of the accelerator or the I/O device is allowed only when the permission check succeeds. Therefore, security of the system memory is ensured.

In a possible design of the first aspect, the reading, based on the identifier of the data stream of the accelerator or the I/O device, permission information corresponding to a first physical page table in which the first physical address is located may include: determining, based on the identifier of the data stream of the accelerator or the I/O device, a physical page table protection table and a protection table cache that correspond to the data stream, where the physical page table protection table stores permission information corresponding to at least one physical page table, and the protection table cache is a cache of the physical page table protection table; determining, based on an identifier of the first physical page table, whether the permission information corresponding to the first physical page table exists in the protection table cache, and if the permission information corresponding to the first physical page table exists in the protection table cache, reading the permission information corresponding to the first physical page table from the protection table cache; and if the permission information corresponding to the first physical page table does not exist, reading the permission information corresponding to the first physical page table from the physical page table protection table, and loading the permission information corresponding to the first physical page table to the protection table cache.

According to the foregoing technical solution, a corresponding protection table cache is set for a physical page table protection table corresponding to a data stream, to cache permission information of a physical page table in the physical page table protection table. When the protection proxy control apparatus needs to obtain permission information of the data stream in a physical page table, the protection proxy control apparatus may first search in the corresponding protection table cache, and when the permission information cannot be found, the protection proxy control apparatus then searches in the physical page table protection table. In this way, efficiency of searching for the permission information can be effectively improved.

In a possible design of the first aspect, one entry of the protection table cache stores permission information corresponding to one or more physical page tables, and an entry that is in the protection table cache and in which permission information corresponding to each physical page table is located is indexed based on a hash value of an identifier of the physical page table. In this way, storage space of the protection table cache can be fully utilized while search efficiency is ensured, and resource utilization is improved.

In a possible design of the first aspect, the reading, based on the identifier of the data stream of the accelerator or the I/O device, permission information corresponding to a first physical page table in which the first physical address is located may include: determining, based on the identifier of the data stream of the accelerator or the I/O device, a physical page table protection table corresponding to the data stream, where the physical page table protection table stores permission information corresponding to at least one physical page table; and reading, from the physical page table protection table based on an identifier of the first physical page table, the permission information corresponding to the first physical page table.

In a possible design of the first aspect, before the reading, based on the identifier of the data stream of the accelerator or the I/O device, permission information corresponding to a first physical page table in which the first physical address is located, the method further includes: reading a protection stream table entry corresponding to a stream identifier of the data stream of the accelerator or the I/O device in a protection stream table, where the protection stream table entry includes first control information and second control information, the first control information indicates whether global permission information of the physical page table protection table corresponding to the data stream is unreadable and unwritable, and the second control information indicates a boundary range of the physical page table protection table; and if it is determined, based on the first control information and the second control information, that the global permission information of the physical page table protection table is not unreadable and unwritable, and the first physical address is within the boundary range of the physical page table protection table, reading the permission information corresponding to the first physical page table in which the first physical address is located.

According to the foregoing technical solution, the protection stream table entry corresponding to the data stream is established in the protection stream table, a plurality of types of control configuration information may be set for the data stream, to implement an access control function.

In a possible design of the first aspect, the protection stream table entry further includes third control information, and the third control information indicates a protection granularity of the physical page table protection table; and before the reading permission information corresponding to the first physical page table in which the first physical address is located, the method further includes: determining, based on the boundary range and the protection granularity of the physical page table protection table, the first physical page table in which the first physical address is located.

In a possible design of the first aspect, the protection stream table entry further includes fourth control information, and the fourth control information indicates whether to enable a function of checking memory access permission for the data stream; and after the reading a protection stream table entry corresponding to a stream identifier of the data stream of the accelerator or the I/O device in a protection stream table, the method further includes: determining, based on the fourth control information, that the function of checking memory access permission for the data stream is enabled.

In a possible design of the first aspect, the method further includes: receiving, from a translation agent unit, the identifier of the data stream of the accelerator or the I/O device, the first physical address, and permission information that is used by the accelerator or the I/O device to access the first physical address; and if the permission information corresponding to the first physical page table in which the first physical address is located exists in the protection table cache corresponding to the data stream, and the permission information that is corresponding to the first physical page table and that is in the protection table cache is inconsistent with the permission information that is received from the translation agent unit and that is used by the accelerator or the I/O device to access the first physical address, updating, based on the permission information that is received from the translation agent unit and that is used by the accelerator or the I/O device to access the first physical address, the physical page table protection table corresponding to the data stream and the permission information that is corresponding to the first physical page table and that is in the protection table cache.

In a possible design of the first aspect, the method further includes: if the permission information corresponding to the first physical page table in which the first physical address is located does not exist in the protection table cache corresponding to the data stream, using, as the permission information corresponding to the first physical page table in which the first physical address is located, the permission information that is received from the translation agent unit and that is used by the accelerator or the I/O device to access the first physical address, and writing the permission information that is received from the translation agent unit and that is used by the accelerator or the I/O device to access the first physical address separately into the physical page table protection table corresponding to the data stream and/or the protection table cache corresponding to the data stream.

According to the foregoing technical solution, before the accelerator or the I/O device initiates direct physical address access by using a physical address obtained from the translation agent unit, the protection proxy control apparatus may refresh, based on the physical address and corresponding permission information that are obtained from the translation agent unit, the protection table cache and the permission information of the corresponding physical page table in the physical page table protection table, to ensure that permission check can be subsequently performed on the memory access request of the accelerator or the I/O device by using accurate permission information, and ensure security of the system memory.

In a possible design of the first aspect, the method further includes: receiving page table invalidation information from a page table management module, where the page table invalidation information includes the identifier of the data stream of the accelerator or the I/O device and identifiers of one or more invalid physical page tables; and updating the protection table cache corresponding to the data stream and permission information corresponding to the one or more invalid physical page tables in the physical page table protection table, to unreadable and unwritable.

In a possible design of the first aspect, the method further includes: receiving page table invalidation information from a page table management module, where the page table invalidation information includes the identifier of the data stream of the accelerator or the I/O device and indication information for performing global invalidation on a physical page table related to the data stream; and setting the global permission information that is of the physical page table protection table corresponding to the data stream and that is stored in the protection stream table entry corresponding to the identifier of the data stream in the protection stream table, to unreadable and unwritable.

According to the foregoing technical solution, the protection proxy control apparatus may perform corresponding processing when a physical page table related to the data stream of the accelerator or the I/O device is invalidated, so that permission information of the invalid physical page table can be updated to unreadable and unwritable in time. In this way, subsequent access to this part of invalid physical page table is avoided, and security of the system memory is ensured.

According to a second aspect, this application provides a protection proxy control apparatus, where a protection stream table and a physical page table protection table corresponding to at least one data stream are configured in the protection proxy control apparatus, and the protection proxy control apparatus uses the protection stream table and the physical page table protection table corresponding to the at least one data stream, to control access of a third-party accelerator or an I/O device to a system memory.

The protection stream table includes a protection stream table entry corresponding to the at least one data stream, and a protection stream table entry corresponding to each data stream stores control configuration information of the data stream. A physical page table protection table corresponding to each data stream stores permission information corresponding to at least one physical page table, and the permission information corresponding to each physical page table indicates whether the data stream has a read permission and/or a write permission in the physical page table.

In a possible design of the second aspect, the protection proxy control apparatus further includes a protection table cache of each physical page table protection table, and the protection table cache is used to cache permission information corresponding to the physical page table in the physical page table protection table.

In a possible design of the second aspect, the control configuration information includes one or more items of the following information: first control information, second control information, third control information, fourth control information, and fifth control information, where the first control information indicates whether global permission information of a physical page table protection table corresponding to the data stream is unreadable and unwritable, the second control information indicates a boundary range of the physical page table protection table corresponding to the data stream, the third control information indicates a protection granularity of the physical page table protection table corresponding to the data stream, the fourth control information indicates whether a function of checking memory access permission is enabled for the data stream, and the fifth control information indicates whether to control the accelerator or the I/O device to which the data stream belongs to initiate only virtual address access.

According to a third aspect, an embodiment of this application provides a protection proxy control apparatus. The apparatus has a function of implementing any one of the first aspect or the possible designs of the first aspect. Functions of the apparatus may be implemented by hardware, or may be implemented by hardware executing corresponding software. The hardware or software includes one or more modules or units corresponding to the foregoing functions.

In a possible design, a structure of the apparatus includes a processing module and a transceiver module, and the processing module is configured to support the apparatus in performing a corresponding function in any one of the first aspect or the designs of the first aspect. The transceiver module is configured to support communication between the apparatus and another communication device (for example, an accelerator or an I/O device). The apparatus may further include a storage module. The storage module is coupled to the processing module, and stores program instructions and data that are necessary for the apparatus. In an example, the processing module may be a processor, a communication module may be a transceiver, and the storage module may be a memory. The memory may be integrated with the processor, or may be separate from the processor. This is not limited in this application.

In another possible design, a structure of the apparatus includes a processor, and may further include a memory. The processor is coupled to the memory, and may be configured to execute computer program instructions stored in the memory, so that the apparatus performs the method in any one of the first aspect or the possible designs of the first aspect. Optionally, the apparatus further includes a communication interface, and the processor is coupled to the communication interface. The communication interface may be a transceiver or an input/output interface, or when a specific implementation form of the apparatus is a chip, the communication interface may be an input/output interface of the chip. Optionally, the transceiver may be a transceiver circuit, and the input/output interface may be an input/output circuit.

According to a fourth aspect, an embodiment of this application provides a chip system. The chip system includes a processor, the processor is coupled to a memory, the memory is configured to store a program or instructions, and when the program or the instructions is/are executed by the processor, so that the chip system implements the method in any one of the first aspect or the possible designs of the first aspect.

Optionally, the chip system further includes an interface circuit, and the interface circuit is configured to exchange code instructions to the processor.

Optionally, there may be one or more processors in the chip system, and the processor may be implemented by hardware or may be implemented by software. When the processor is implemented by using the hardware, the processor may be a logic circuit, an integrated circuit, or the like. When the processor is implemented by using the software, the processor may be a general-purpose processor, and is implemented by reading software code stored in the memory.

Optionally, there may also be one or more memories in the chip system. The memory may be integrated with the processor, or may be disposed separately from the processor. This is not limited in this application. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in this application.

According to a fifth aspect, an embodiment of this application provides a computer-readable storage medium. The computer-readable storage medium stores a computer program or instructions. When the computer program or the instructions is/are executed, a computer is enabled to perform the method in any one of the first aspect or the possible designs of the first aspect.

According to a sixth aspect, an embodiment of this application provides a computer program product. When a computer reads and executes the computer program product, the computer is enabled to perform the method in any one of the first aspect or the possible designs of the first aspect.

According to a seventh aspect, an embodiment of this application provides a computer system. The computer system includes the protection proxy control apparatus described in this application, a CPU coupled to the protection proxy control apparatus, and at least one third-party accelerator or I/O device.

DESCRIPTION OF EMBODIMENTS

To make objectives, technical solution, and advantages of embodiments of this application clearer, the following further describes embodiments of this application in detail with reference to the accompanying drawings.

It should be understood that a specific operation method in a method embodiment of this application may also be applied to an apparatus embodiment or a system embodiment. "A plurality of" means two or more. In view of this, "a plurality of" may also be understood as "at least two" in embodiments of this application. "At least one" may be understood as one or more, for example, one, two, or more. For example, "including at least one" means including one, two, or more, and does not limit which items are included. For example, if at least one of A, B, and C is included, A, B, C, A and B, A and C, B and C, or A, B, and C may be included. Similarly, understanding of descriptions such as "at least one type" is similar. The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects.

Unless otherwise stated, ordinal numbers such as "first" and "second" in embodiments of this application are used to distinguish between a plurality of objects, but are not intended to limit a sequence, a time sequence, priorities, or importance of the plurality of objects. In addition, descriptions of "first" and "second" do not necessarily indicate that objects are different.

The memory protection method provided in this embodiment of this application may be executed by a protection agent control (PAC) apparatus, and is used to check an access permission for an access request that is for accessing a system memory by using a direct physical address and that is from an accelerator or an I/O device of a third party.

Specifically, the PAC apparatus may be used as a standard address access protection module and integrated into an existing input/output memory management unit (IOMMU)/system memory management unit (SMMU) system, or may be used only as an agent module and integrated between an accelerator and a system memory or between an I/O device and a system memory. The PAC apparatus is disposed, so that all access requests for accessing the system memory by using the direct physical address of the accelerator/I/O device can be checked by using the PAC module to determine whether the access requests have corresponding access permission. Therefore, security of the system memory is ensured.

Figure 1A:
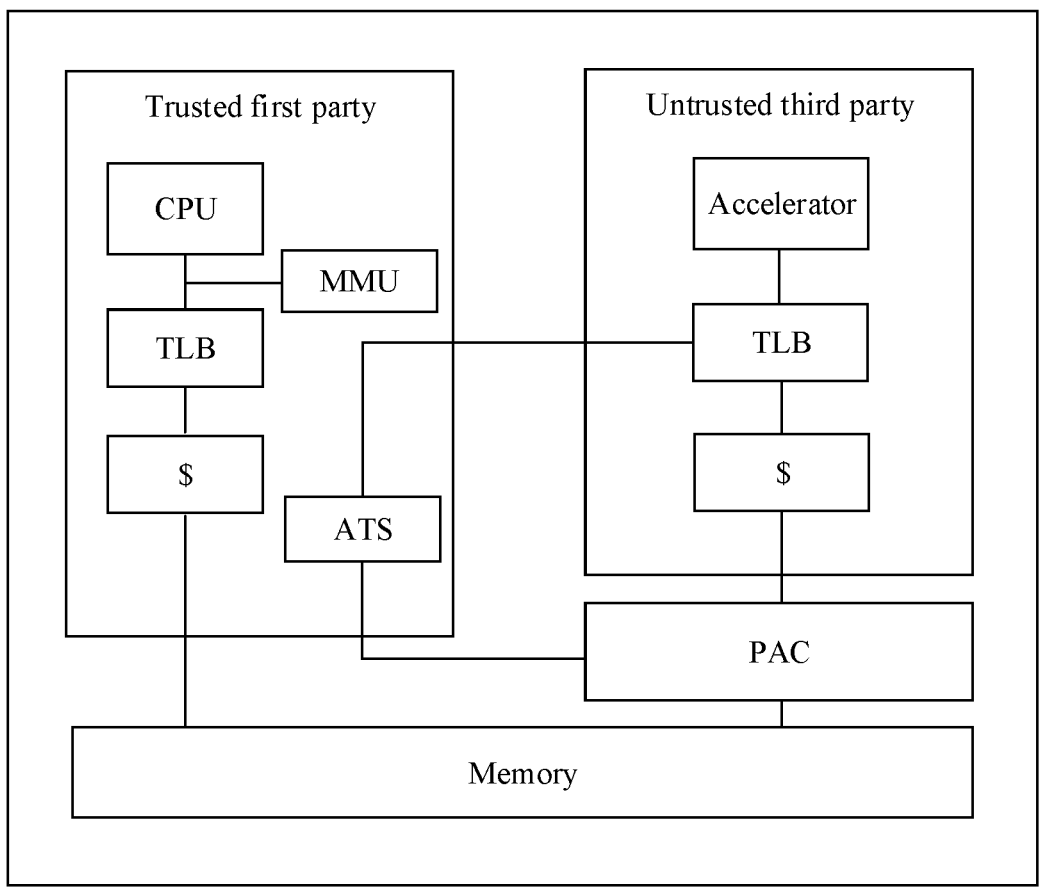
FIG. 1a to FIG. 1d are schematic diagrams of system architectures to which an embodiment of this application is applicable.

For example, the technical solutions provided in this application may be applied to a system on chip (SoC) system integrated with a third-party accelerator. As shown in FIG. 1a, the SoC system includes a system memory, a CPU, an accelerator (accel) from an untrusted third party, and the PAC apparatus. The PAC apparatus is integrated between the system memory and the third-party accelerator, and has an effect of protecting the system memory. The SoC system further includes modules such as a memory management unit (MMU), a translation lookaside buffer (TLB), and an address translation service (ATS) that separately match the CPU and the third-party accelerator.

Figure 1B:
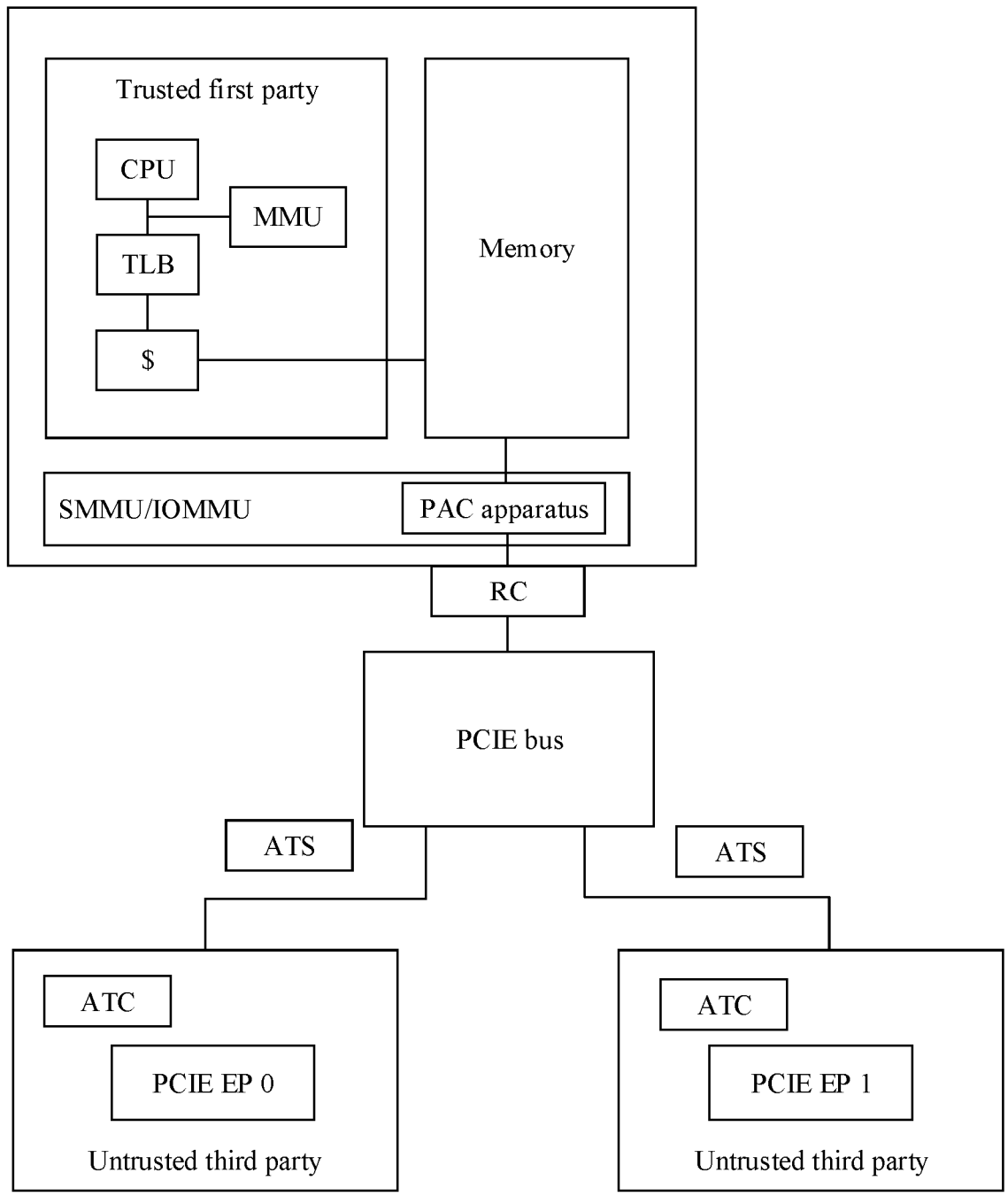

The technical solutions provided in this application may also be applied to a computing network system extended through a PCI Express bus. As shown in FIG. 1b, a CPU is interconnected with an external I/O device through the PCI Express bus, to form a computing network system. The PAC apparatus is integrated in a primary server, the I/O device connected through the PCI Express bus implements an ATS function of the PCI Express protocol, and the I/O device locally implements an address translation cache (ATC) function. The I/O device may obtain, from the primary server in advance by using an ATS mechanism, a physical address that requires direct memory access, and then cache the physical address to a local ATC module. In this way, when direct memory access is required, the I/O device may directly initiate a physical address to access a memory of the primary server, and does not need the IOMMU/SMMU to look up a page table, and can securely access the system memory only by passing a permission check of the PAC.

Figure 1C:
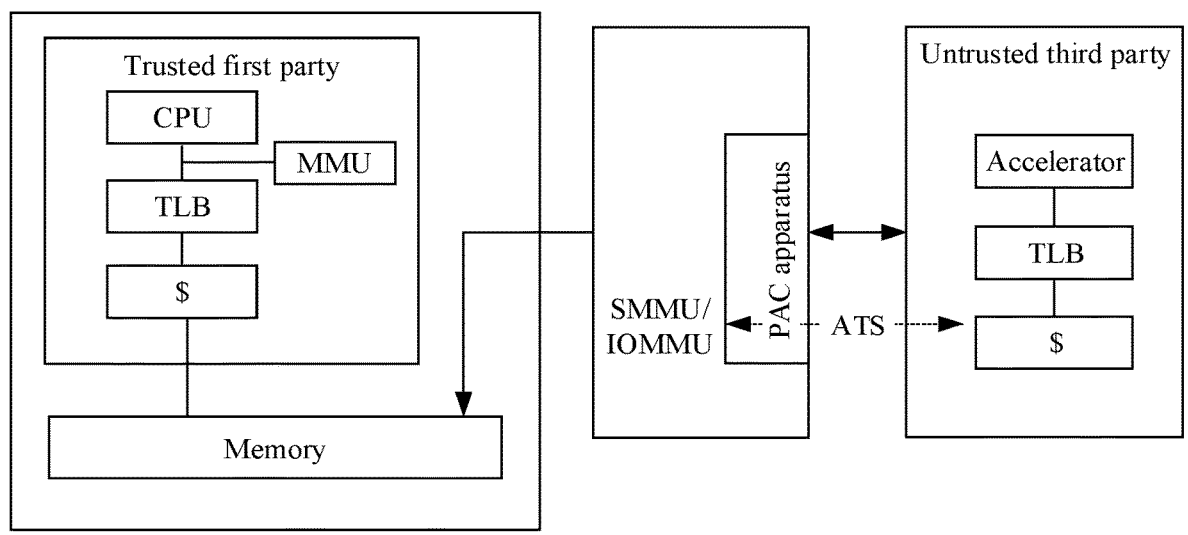

The technical solutions provided in this application may be further applied to a computing network system with non-PCI Express bus extension. As shown in FIG. 1c, a CPU is connected to an external I/O device through a non-PCI Express bus, to form a computing network system. The PAC apparatus in this application is integrated in a primary server, and the bus supports an ATS mechanism similar to a PCI Express bus, so that the I/O device can obtain, in advance, a physical address of system memory space when direct memory access is required, and then cache the physical address to a local ATC module. In this way, when direct memory access is required, the I/O device may directly initiate a physical address to access a memory of the primary server. In this case, the I/O device does not need the IOMMU/SMMU to look up a page table, and can securely access the system memory only by passing a permission check of the PAC.

Figure 1D:
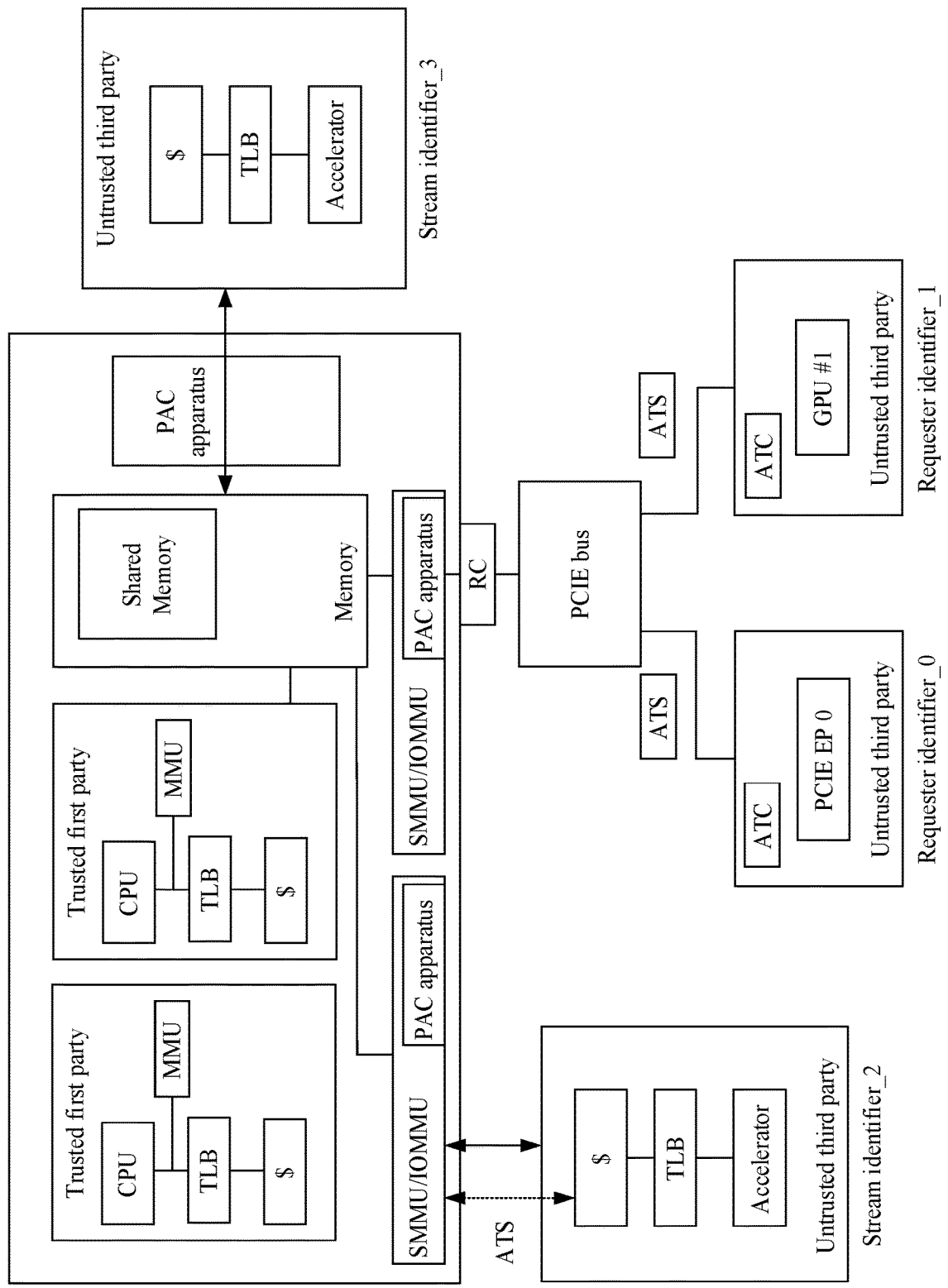

The technical solutions provided in this application may be further applied to a hybrid high-performance computing system architecture. As shown in FIG. 1d, in the computing system, a CPU is connected to a plurality of external I/O devices through a PCI Express bus. In addition, the CPU is further connected to an external accelerator through a non-PCI Express bus. All these I/O devices/accelerators support an ATS or a mechanism similar to an ATS, and may obtain, in advance, a physical address of system memory space that requires direct memory access. The PAC apparatus of this application is implemented between these I/O devices/external accelerators and the system memory. In addition, a third-party accelerator (for example, a third-party accelerator IP) is integrated into the CPU, and the PAC apparatus in this application is also implemented between the third-party accelerator and the system memory. The PAC apparatus in this application is disposed between the I/O device and a system memory of an accelerator UI, to implement security protection for accessing the system memory by the I/O device/accelerator.

Figure 2:
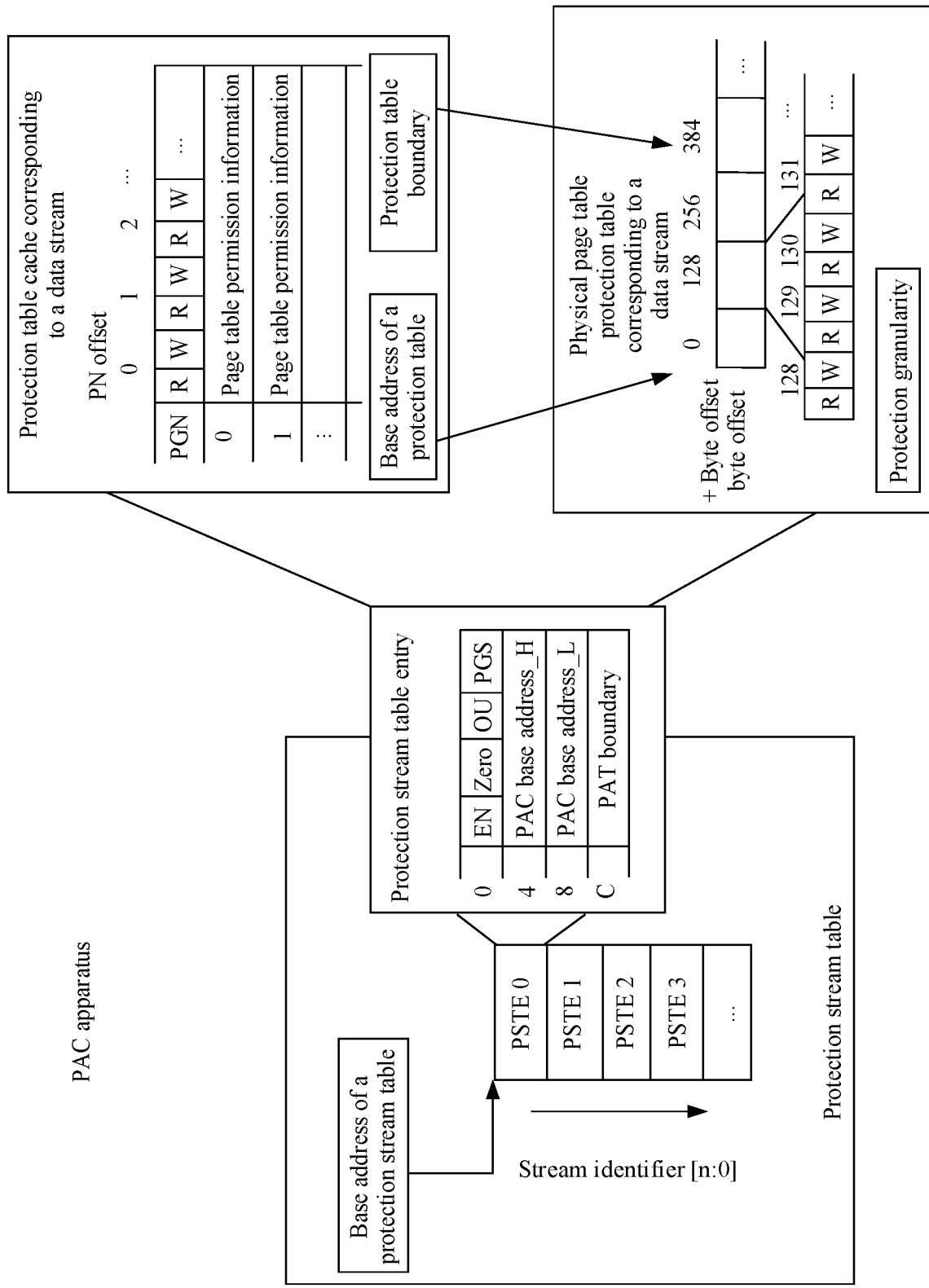
FIG. 2 is a schematic diagram of a structure of a protection proxy control apparatus according to an embodiment of this application.

FIG. 2 is a schematic diagram of a structure of a protection proxy control (PAC) apparatus according to an embodiment of this application. The PAC apparatus includes a protection stream table (PST) and a physical page table protection table (PPPT) corresponding to at least one data stream. Optionally, to improve table lookup performance, the PAC apparatus may further include a protection table cache (protection table cache, PTC) of each physical page table protection table.

The following separately describes in detail the protection stream table, the physical page table protection table, and the protection table cache that are implemented in the PAC apparatus.

1. Protection Stream Table

The protection stream table includes a protection stream table entry (PSTE) corresponding to at least one data stream, and the protection stream table entry corresponding to each data stream stores control configuration information corresponding to the data stream.

For a data stream, the control configuration information may include one or more of first control information, second control information, third control information, fourth control information, and fifth control information. The first control information indicates whether global permission information of a physical page table protection table corresponding to the data stream is unreadable and unwritable, the second control information indicates a boundary range of a physical page table protection table corresponding to the data stream, the third control information indicates a protection granularity of a protection stream table corresponding to the data stream, the fourth control information indicates whether a function of checking memory access permission is enabled for the data stream, and the fifth control information indicates whether an accelerator or an I/O device to which the data stream belongs is controlled to initiate only virtual address access.

It should be noted that, in this embodiment of this application, the protection stream table may provide a software programming interface for external devices, and system software may separately set control configuration information for different data streams by using the software programming interface. Because control configuration information corresponding to different data streams is separately set and is independent of each other, information content included in the control configuration information corresponding to the different data streams may be the same or may be different. This is not limited in this application.

In this embodiment of this application, the protection stream table is indexed based on an identifier of a data stream. In this way, for a data stream, a protection stream table entry corresponding to the data stream may be located based on the identifier of the data stream, and further, control configuration information corresponding to the data stream may be obtained from the corresponding protection stream table entry. As described above, the second control information in the control configuration information indicates the boundary range of the physical page table protection table corresponding to the data stream, and the boundary range of the physical page table protection table may also be understood as interval ranges of physical addresses of all physical page tables in the physical page table protection table. For example, the second control information may include information such as a base address and a size of the physical page table protection table.

The identifier of the data stream is used to distinguish between data streams of different accelerators or I/O devices, and the identifier of the data stream may be in a one-to-one correspondence with device identifiers of the accelerators or I/O devices. The identifier of the data stream may also be referred to as a stream identity (stream ID), and the device identifier may also be referred to as a device identity (device ID). For example, the identifier of the data stream may be a stream identifier (Stream ID) in an SMMU under an ARM architecture, the device identifier may be a requester identifier (Requester ID) in a PCI Express bus, and the requester ID and the stream ID are in a one-to-one mapping relationship. In this way, the PCI Express bus can also be implemented in the ARM architecture.

Figure 3A:
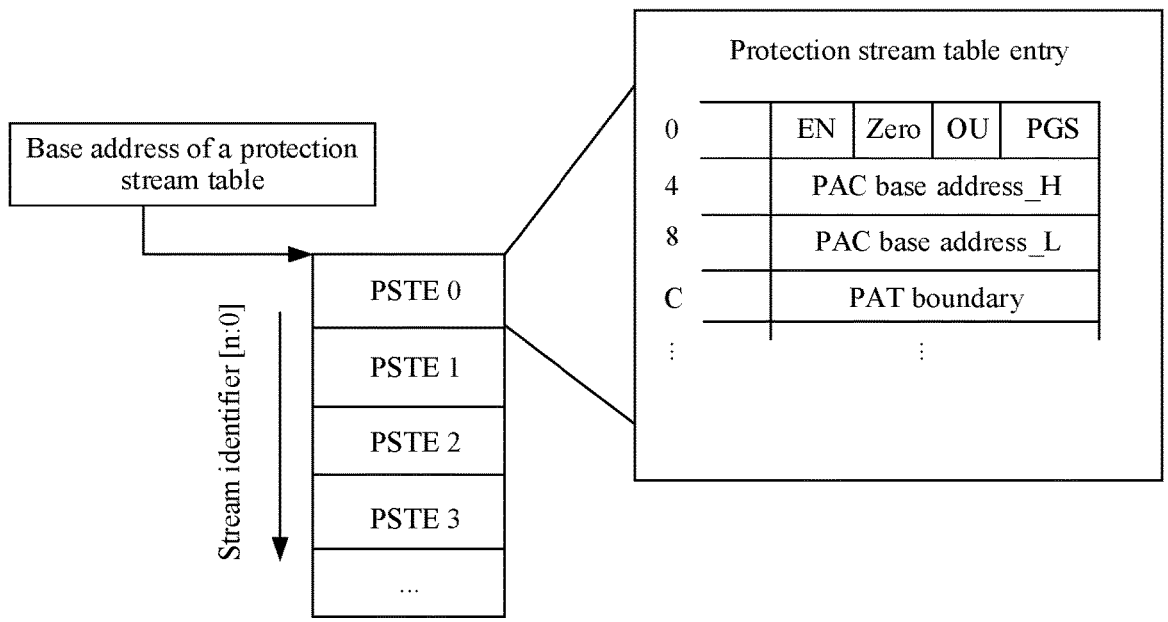
FIG. 3a is a schematic diagram of a protection stream table according to an embodiment of this application.

FIG. 3a is a schematic diagram of a protection stream table according to an embodiment of this application. The protection stream table includes a plurality of protection stream table entries such as PSTE 0, PSTE 1, PSTE 2, PSTE 3, . . . , and the like. The protection stream table is indexed by using an identifier (stream ID) of a data stream, that is, one data stream corresponds to one protection stream table entry, and different protection stream table entries may be indexed based on identifiers of different data streams. For example, a data stream 0 may correspond to the PSTE 0 shown in FIG. 3a, and the PSTE 0 may be obtained through indexing based on an identifier of the data stream 0. A data stream 1 may correspond to the PSTE 1 shown in FIG. 3a, and the PSTE 1 may be obtained through indexing based on an identifier of the data stream 1. A data stream 2 may correspond to the PSTE 2 shown in FIG. 3a, and the PSTE 2 may be obtained through indexing based on an identifier of the data stream 2. A data stream 3 may correspond to the PSTE 3 shown in FIG. 3a, and the PSTE 3 may be obtained through indexing based on an identifier of the data stream 3.

The protection stream table entry PSTE 0 is used as an example, the protection stream table entry may include the following fields of the control configuration information:

(1) An EN field. The EN field indicates whether a protection proxy control (PAC) mechanism is enabled, that is, whether a permission of directly using a physical address to access a system memory by the data stream is checked. The EN field is the foregoing fourth control information, and indicates whether a function of checking a memory access permission is enabled for the data stream.

For example, the EN field may be represented by using one bit. When a value of the EN field is 1, it may indicate that the PAC mechanism is enabled, and memory access permission check needs to be performed on all memory access requests from the data stream. When a value of the EN field is 0, it may indicate that the PAC mechanism is not enabled, and no memory access permission check is performed on a memory access request from the data stream.

(2) A Zero field. The Zero field indicates whether a physical page table protection table corresponding to the data stream is in an initialization period. If the physical page table protection table corresponding to the data stream is in the initialization period, permission information of all physical page tables in the physical page table protection table corresponding to the data stream is unreadable and unwritable. The Zero field is the foregoing first control information, and indicates whether global permission information of the physical page table protection table corresponding to the data stream is unreadable and unwritable.

(3) An OU field. The OU field indicates whether to control an accelerator or an I/O device to which the data stream belongs to initiate only virtual address access, but not physical address access. The OU field is the foregoing fifth control information, and indicates whether to control the accelerator or the I/O device to which the data stream belongs to initiate only virtual address access.

For example, the OU field may be represented by using one bit. When a value of the bit is 1, it may indicate that only the accelerator or the I/O device to which the data stream belongs is allowed to initiate virtual address access, and is not allowed to initiate physical address access. When a value of the bit is 0, it may indicate that the accelerator or the I/O device to which the data stream belongs is allowed to initiate physical address access. In this way, if the PAC apparatus receives a memory access request from an accelerator or an I/O device, and the accelerator or the I/O device requests to directly use a physical address to access address space in a system memory, the PAC apparatus may find, in the protection stream table based on an identifier of a data stream of the accelerator or the I/O device, a protection stream table entry corresponding to the identifier of the data stream of the accelerator or the I/O device. In this case, if a value of the OU field in the protection stream table entry is 1, the PAC apparatus may determine that the accelerator or the I/O device to which the data stream belongs needs to be controlled to initiate only virtual address access, and may further reject the memory access request.

(4) A PGS field. The PGS field indicates a check granularity when a memory access permission check is performed on the data stream. In this embodiment of this application, the PAC apparatus may check the memory access permission in a unit of a physical page table. Therefore, the check granularity is a size of each physical page table, that is, a protection granularity of a physical page table protection table. The PGS field is the foregoing third control information, and indicates a protection granularity of a physical page table protection table corresponding to the data stream.

(5) (PAC base address_H field, PAC base address_L field). The PAC base address_H field and the PAC base address_L field indicate a base address of a physical page table protection table corresponding to the data stream. The PAC base address_H field (that is, a PAC base address_H field) indicates higher N bits of the base address of the physical page table protection table, and the PAC base address_L field (that is, a PAC base address_L field) indicates lower N bits of the base address of the physical page table protection table. For example, a value of N may be 32, that is, the PAC base address_H field and the PAC base address_L field respectively indicate higher 32 bits and lower 32 bits of the base address of the physical page table protection table.

(6) A PAT boundary field. The PAT boundary field indicates a size of a physical page table protection table corresponding to the data stream.

The (PAC base address_H field, PAC base address_L field) and the PAT boundary field are the foregoing second control information, and a boundary range of the physical page table protection table corresponding to the data stream may be uniquely determined by using these fields, that is, an interval range of a physical address related to the physical page table in the physical page table protection table. In this way, the physical page table protection table can be subsequently queried based on the physical address or the identifier of the physical page table, to determine memory access permission of the data stream.

It should be noted that the foregoing several fields are several examples of the control configuration information in the protection stream table entry, and the protection stream table entry may further include other control configuration information. This is not limited in this application. Further, because the protection stream table may provide a software programming interface for the external devices, the system software may expand, by using the software programming interface, more other control configuration information in the protection stream table entry. Therefore, security and scalability of access control are enhanced.

Figure 3B:
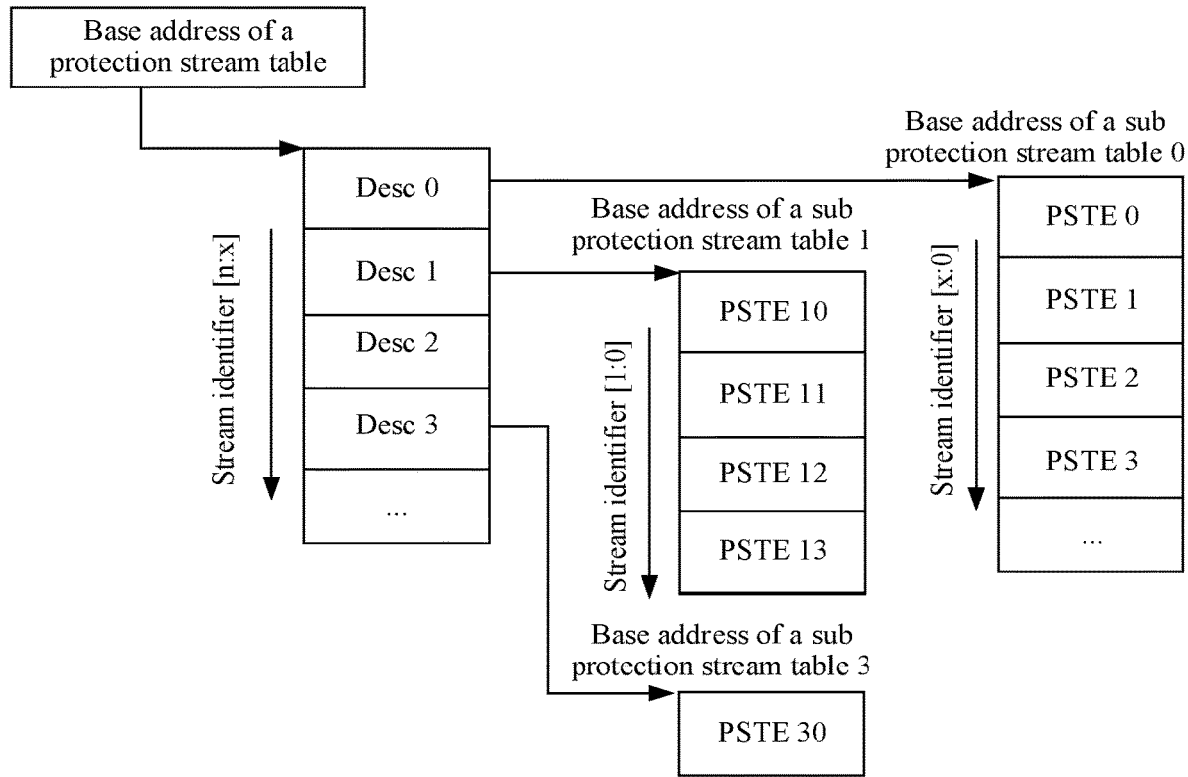
FIG. 3b is a schematic diagram of a level-2 protection stream table according to an embodiment of this application.

In a possible implementation, the protection stream table in this embodiment of this application may alternatively be a level-2 protection stream table, and the level-2 protection stream table may also be understood as a level-2-index protection stream table. FIG. 3b is a schematic diagram of the level-2 protection stream table according to an embodiment of this application. Specifically, the level-2 protection stream table means that a protection stream table is divided into two levels, each entry (Desc) in an upper-level protection stream table stores description information of a protection substream table, description information of different protection substream tables points to different protection stream tables in a next level, and each entry (PSTE) of a next-level protection stream table stores control configuration information of a corresponding data stream.

Both of the upper-level protection stream table and the next-level protection stream table may be indexed by using an identifier of a data stream. In the upper-level protection stream table, different entries may be indexed in the upper-level protection stream table based on an identifier of the data stream. However, it should be noted that an identifier of one data stream may correspond to one entry in the upper-level protection stream table, but one entry in the upper-level protection stream table may correspond to identifiers of one or more data streams, or correspond to an interval of an identifier of one data stream. In other words, in the upper-level protection stream table, there may be a one-to-one or many-to-one relationship between identifiers of data streams and entries. A unique entry may be indexed in an upper-level data stream table based on an identifier of one data stream, but a same entry may be indexed in the upper-level data stream table for identifiers of different data streams.

In the next-level protection stream table, different entries may be indexed in the next-level protection stream table based on the identifier of the data stream, and the identifier of the data stream is in a one-to-one correspondence with the entries in the next-level protection stream table. A unique entry may be indexed in the next-level protection stream table based on an identifier of a data stream, and the entry stores control configuration information corresponding to the data stream.

In this embodiment of this application, the data stream table is set in a form of a level-2 protection stream table, so that when there are a large quantity of data streams, query efficiency of the data stream table can be improved. In this way, a protection stream table entry corresponding to the data stream can be found more efficiently, and corresponding control configuration information can be obtained.

In still another possible implementation, the protection stream table in this embodiment of this application may alternatively be a process-level protection stream table. Specifically, the protection stream table mentioned above in this application may be understood as a device-level protection stream table, and means that data streams of different accelerators/I/O devices correspond to different protection stream table entries in the protection stream table. In this way, control configuration information may be separately set for data streams of different accelerators/I/O devices. In addition, data streams of different accelerators/I/O devices may correspond to different physical page table protection tables, to separately perform access control on data streams of different accelerators/I/O devices.

The process-level protection stream table is further used to distinguish sub data streams of different processes in a data stream of an accelerator/I/O device. Correspondingly, a process-level protection sub stream table is created for the data stream in a device-level protection stream table. The sub-protection stream table includes a sub-protection stream table entry corresponding to at least one sub data stream, and sub data streams of different processes correspond to different sub protection stream table entries in the sub protection stream table. In this way, control configuration information may be separately set for sub data streams of different processes in the data stream. In addition, sub data streams of different processes may correspond to different physical page table protection tables, so that access control can be separately performed on sub data streams of different processes in one data stream. Therefore, fineness of access control can be effectively improved.

Figure 3C:
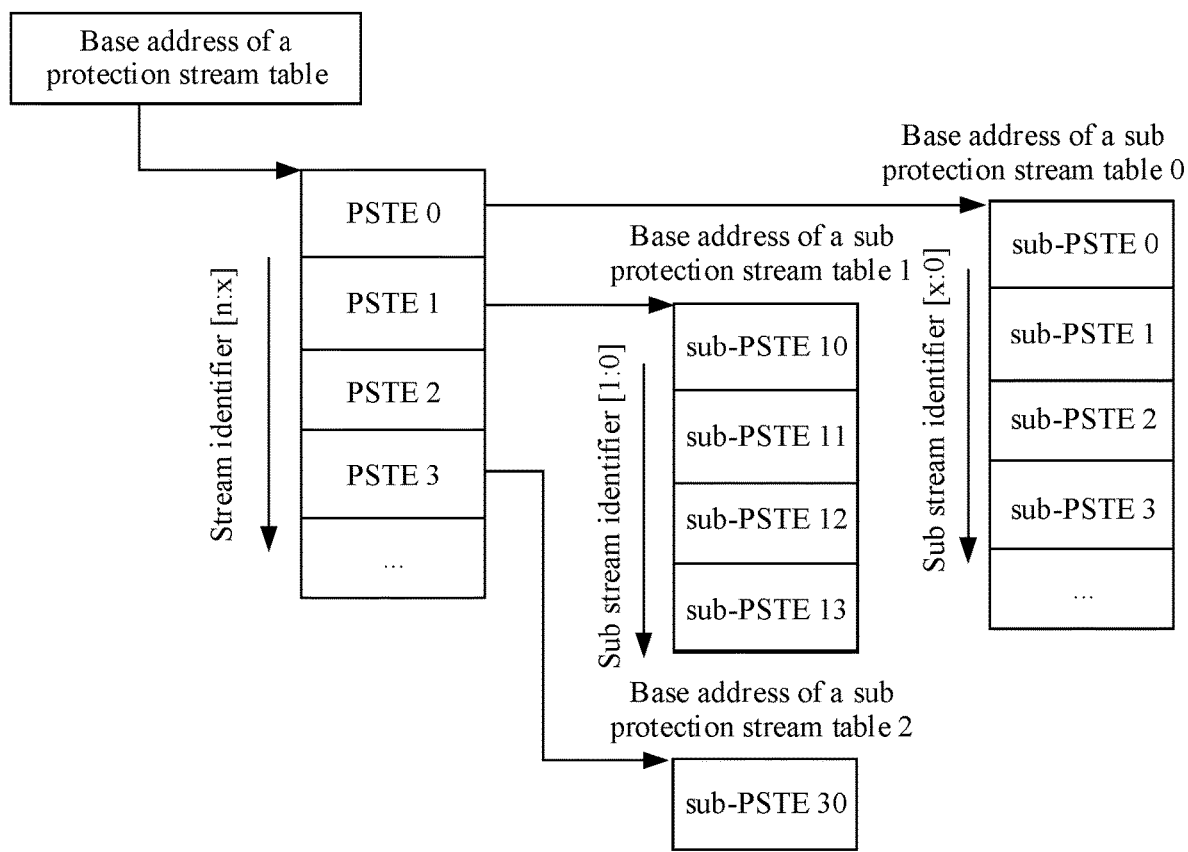
FIG. 3c is a schematic diagram of a process-level protection stream table according to an embodiment of this application.

FIG. 3c is a schematic diagram of a process-level protection stream table according to an embodiment of this application. As shown in FIG. 3c, a device-level protection stream table includes a protection stream table entry corresponding to at least one data stream. A data stream of an accelerator or an I/O device corresponds to a protection stream table entry, different protection stream table entries are indexed based on identifiers of data streams, and identifiers of data streams are one-to-one mapped to device identifiers of accelerators or I/O devices.

It should be noted that the at least one data stream in the protection stream table may include data streams on which access control needs to be separately performed for sub data streams of different processes in the data streams (that is, a data stream on which access control is performed at a process level). Alternatively, the data stream may include a data stream for which access control does not need to be separately performed on sub data streams of different processes in the data streams (that is, a data stream for which access control is performed at a data-stream level). In view of this, in the device-level protection stream table, a protection stream table entry corresponding to each data stream may further include indication information for indicating whether access control needs to be separately performed on sub data streams of different processes in the data stream. The indication information may be represented by one bit.

For a data stream, if access control needs to be separately performed on sub data streams of different processes in the data stream, a protection stream table entry corresponding to the data stream may store description information of a sub protection stream table of the data stream, where the description information of the sub protection stream table points to the sub protection stream table of the data stream.

Further, the sub protection stream table of the data stream includes a sub protection stream table entry corresponding to at least one sub data stream. One sub data stream corresponds to one sub protection stream table entry, and different sub protection stream table entries are indexed based on identifiers of sub data streams. The identifiers of the sub data streams are used to distinguish sub data streams of different processes in a data stream of an accelerator or an I/O device, and the identifiers of the sub data streams may be one-to-one mapped to identifiers of the processes. For a sub data stream, a sub protection stream table entry corresponding to the sub data stream stores control configuration information corresponding to the sub data stream. For specific information content included in the control configuration information corresponding to the sub data stream, refer to the foregoing description about the control configuration information corresponding to the data stream. Details are not described herein again.

For a data stream, if access control does not need to be separately performed on sub data streams of different processes in the data stream, a protection stream table entry corresponding to the data stream may store control configuration information corresponding to the data stream. Alternatively, the protection stream table entry corresponding to the data stream may store description information of a sub protection stream table of the data stream, where the description information of the sub protection stream table points to a sub protection stream table of the data stream, but the sub protection stream table of the data stream includes only one sub protection stream table entry, and the sub protection stream table entry stores control configuration information applicable to sub data streams of all processes of the data stream.

2. Physical Page Table Protection Table

A physical page table protection table corresponding to each data stream is used to store permission information corresponding to at least one physical page table. Specifically, for a data stream, a physical page table protection table corresponding to the data stream includes a physical page table protection table entry corresponding to at least one physical page table, the physical page table protection table entry corresponding to each physical page table stores permission information of the data stream in the physical page table, and the permission information indicates whether the data stream has a read permission and/or a write permission in the physical page table. For example, the permission information may be represented by using two bits, where a value of one bit (R) indicates whether a user has the read permission, and a value of the other bit (W) indicates whether the user has the write permission. It may be understood that the read permission refers to whether the data stream has permission to perform a read operation in the physical page table, and the write permission refers to whether the data stream has permission to perform a write operation in the physical page table.

The physical page table protection table may be indexed based on a physical address that is aligned based on a size of a protection granularity, for example, an identifier of a physical page table or a physical page table number (PPN). In this way, if an accelerator or an I/O device wants to directly use a physical address to access a piece of memory space, a PAC apparatus may locate, based on an identifier of a data stream of the accelerator or the I/O device, a protection stream table entry corresponding to the data stream in a protection stream table. A physical page table number of a physical page table in which a physical address of memory space that the accelerator or the I/O device requests to access is located may be determined by using an indication of the control configuration information that is of the data stream and that is stored in the protection stream table entry. Then, a physical page table protection table entry corresponding to the physical page table in the physical page table protection table is located based on a physical page table number of the physical page table, and permission information of the data stream in the physical page table is obtained from the physical page table protection table entry, where the permission information determines whether the data stream has a read permission and a write permission in the physical page table.

Figure 4:
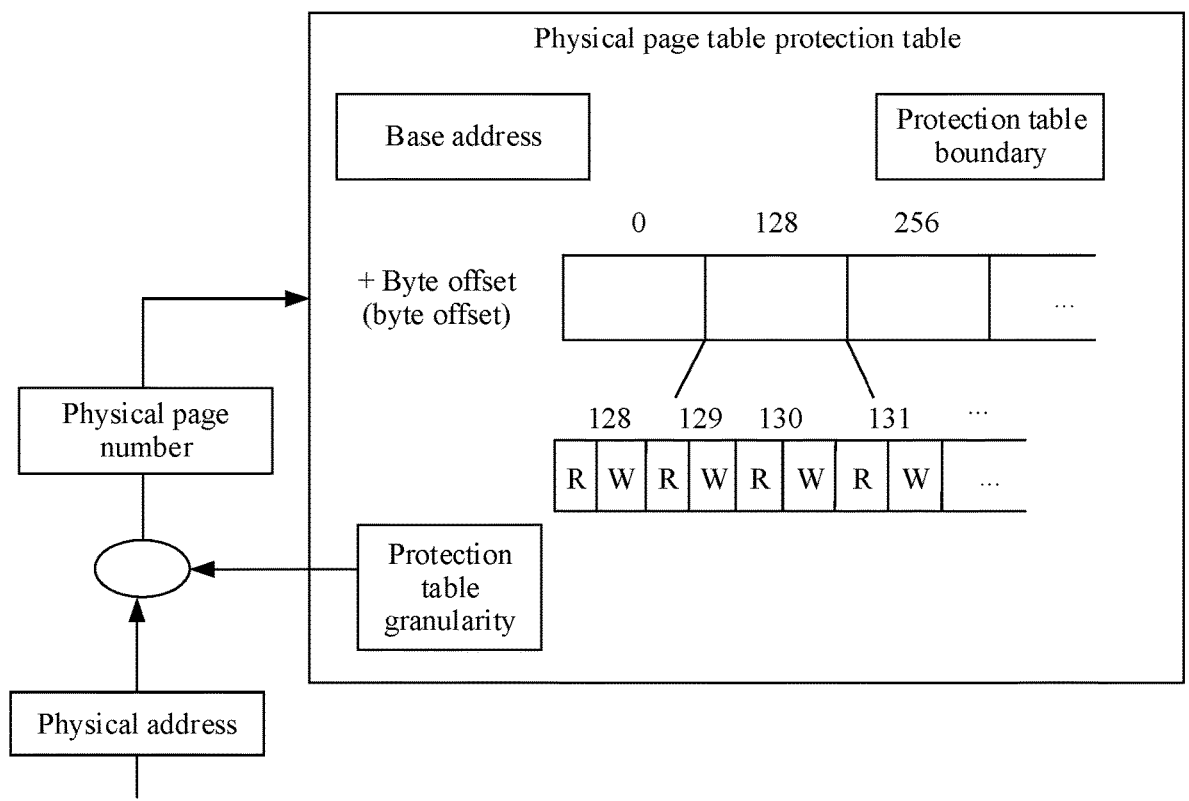
FIG. 4 is a schematic diagram of a physical page table protection stream according to an embodiment of this application.

FIG. 4 is a schematic diagram of a physical page table protection stream table according to an embodiment of this application. The physical page table protection table is a flattened table (flatted table) based on physical address space, and stores information for indicating access permission of a data stream in each physical page table, that is, the permission information mentioned above. In an example, the access permission includes a read permission and a write permission, and correspondingly, each physical page table in the physical page table protection table may have 2-bit permission information. 1-bit permission information in the 2-bit permission information may be referred to as permission information R, and indicates whether the data stream has a read permission in the data page table. For example, when a value of the permission information R is 1, it may indicate that the data stream has a read permission (that is, readable). When the value of the permission information R is 0, it may indicate that the data stream does not have the read permission (that is, unreadable). The other 1-bit permission information may be referred to as permission information W, and indicates whether the data stream has a write permission in the data page table. For example, when a value of the permission information R is 1, it may indicate that the data stream has a write permission (that is, writable). When the value of the permission information W is 0, it may indicate that the data stream does not have the write permission (that is, unwritable).

In this way, after a physical address to be accessed by an accelerator or an I/O device is obtained, a physical page table number of a physical page table in which the physical address is located may be determined based on the physical address and a protection granularity of a physical page table protection table, and then the physical page table protection table is queried based on the physical page table number, to locate a physical page table protection table entry corresponding to the physical page table, and further determine, based on permission information that is of the physical page table and that is stored in the physical page table entry, whether the data stream of the accelerator or the I/O device has access permission in the physical page table.

3. Protection Table Cache

Each physical page table protection table may have a corresponding protection table cache, and the protection table cache is used to cache permission information corresponding to a physical page table in the physical page table protection table. The protection table cache may also be referred to as a protection table cache, or may also be referred to as a cache of a physical page table protection table or a cache of a physical page table protection table. This is not limited in this application.

As a high-speed cache of the physical page table protection table, the protection table cache usually stores permission information that has been recently accessed or that is frequently accessed. Therefore, a hit rate of the protection table cache may be high. When permission information corresponding to a data stream in a physical page table needs to be searched in the physical page table protection table, the permission information may be first searched in a protection table cache of the physical page table protection table. If the permission information cannot be found in the protection table cache, the permission information is searched in the physical page table protection table. In this way, efficiency of searching for permission information is effectively improved.

It may be understood that, in this embodiment of this application, permission information in the physical page table protection table may be loaded to the protection table cache according to a cache replacement algorithm, and permission information that is cached in the protection table cache and that has low utilization or long access time is deleted based on a performance requirement. Therefore, permission information of physical page tables cached in the cache of the physical page table protection table dynamically changes.

Specifically, for a physical page table protection table, a protection table cache of the physical page table protection table may also include a plurality of entries, and different entries may also be indexed based on a physical address, for example, a physical address number or a physical page table identifier (for example, a physical page table number PPN). In a possible implementation, one entry in the protection table cache may store permission information corresponding to only one physical page table. In this case, one entry has only 2-bit useful information.

Figure 5:
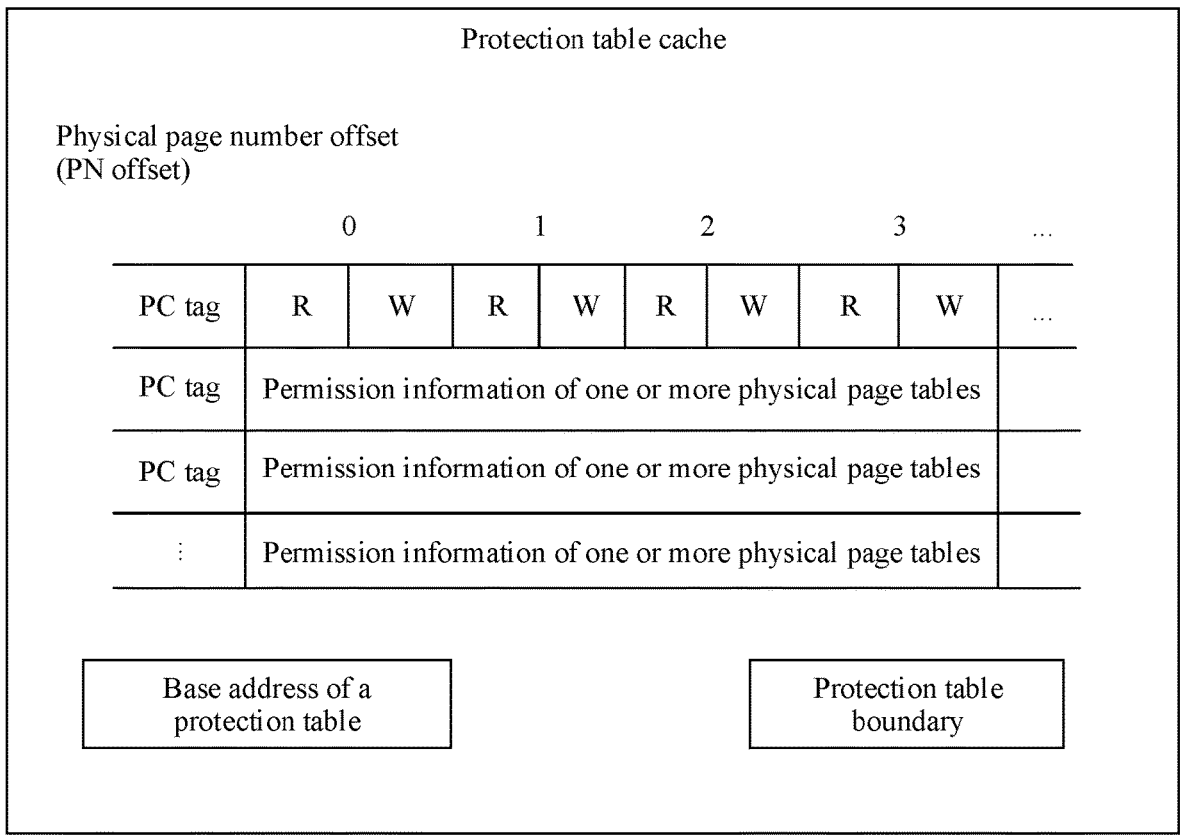
FIG. 5 is a schematic diagram of a protection table cache according to an embodiment of this application.

In another possible implementation, because permission information corresponding to one physical page table has only two bits, and a quantity of bits occupied by each entry in the protection table cache is fixed and is usually greater than two bits, for example, may be eight bits, separately storing permission information of each physical page table in one entry causes storage resource waste. In view of this, to efficiently use storage space in the protection table cache, as shown in FIG. 5, permission information (page permission) corresponding to one or more physical page tables may be stored in a same entry in the protection table cache. In this case, different entries may be indexed by using a hash value of an identifier of a physical page table, that is, a tag of each entry in the protection table cache is a hash value of the identifier of the physical page table. In an example, the hash value may be a divisor obtained by dividing a physical page table number by a maximum quantity of pieces of permission information that is of a physical page table and that can be stored in an entry in a protection table cache, and permission information of a plurality of physical page tables that indicate consecutive physical page table numbers may be stored in a same entry in the protection table cache. It should be noted that a hash algorithm used to calculate the hash value based on the identifier of the physical page table is not specifically limited in this application.

It should be noted that the physical page table protection table and the protection table cache are described by using an example in which the protection stream table is a device-level protection stream table and access control is separately performed on data streams of different accelerators or I/O devices. It may be understood that, in this embodiment of this application, different data streams may correspond to different protection stream table entries in the protection stream table, and different data streams may correspond to different physical page table protection tables and protection table caches. This indicates that access permission can be set for different data streams to implement access control.

In a possible implementation, different data streams may correspond to a same protection stream table entry in the protection stream table, and different data streams may correspond to a same physical page table protection table and a same protection table cache. This indicates that access permission of data streams of all accelerators/I/O devices is consistent, and unified permission control may be performed on all data streams. It should be noted that, in this case, the protection stream table entry no longer needs to be indexed based on an identifier of the data stream, because the protection stream table includes only one protection stream table entry, and control configuration information corresponding to data streams of all accelerators or I/O devices is the same, memory access permission can be checked by looking up the same physical page table protection table and protection table cache.

It should be further understood that, when the protection stream table is a process-level protection stream table, and on the basis of distinguishing data streams of different accelerators or I/O devices, access control is further separately performed on sub data streams of different processes in a same data stream, the physical page table protection table and the protection table cache corresponding to the sub data stream may be implemented by using a method similar to that described above. Details are not described again in this application.

Figure 6:
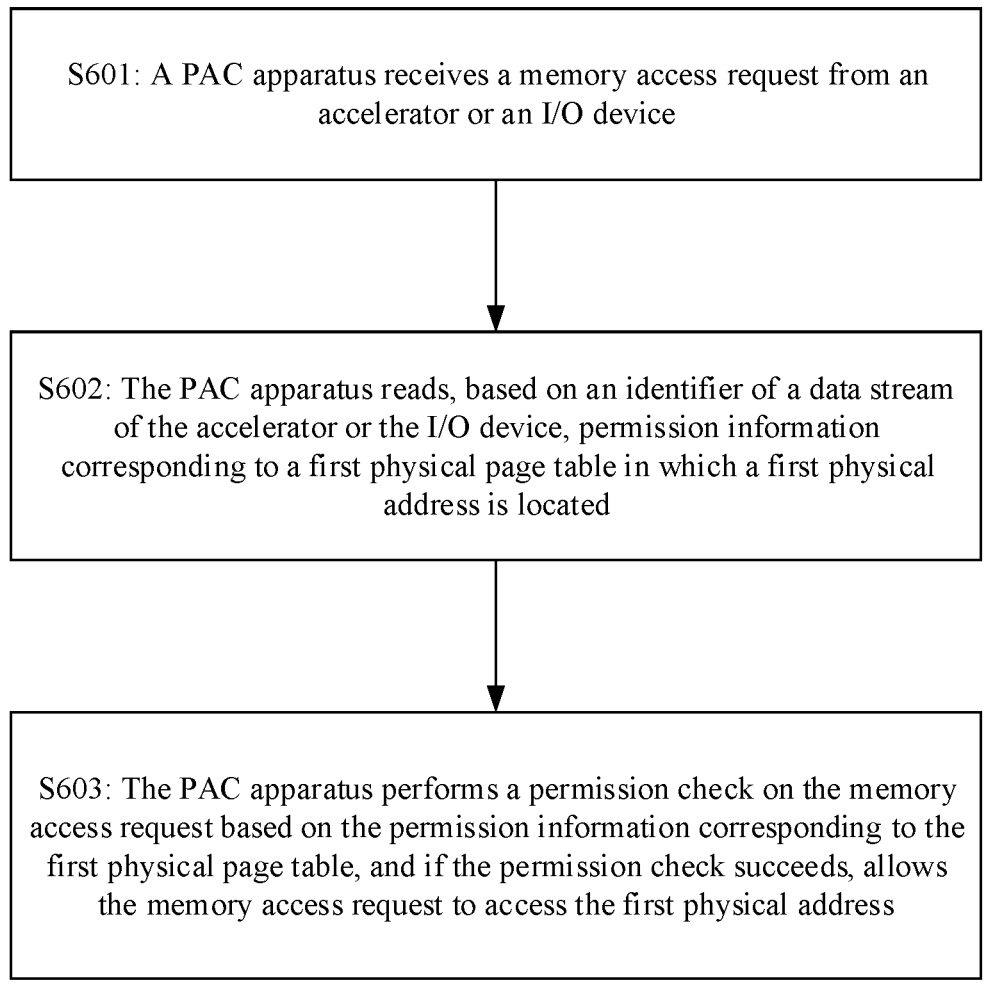
FIG. 6 is a schematic diagram of a memory protection method according to an embodiment of this application.

Based on the foregoing system architecture and the PAC apparatus, FIG. 6 is a schematic flowchart of a memory protection method according to an embodiment of this application. The method includes the following steps:

Step S601: The PAC apparatus receives a memory access request from an accelerator or an I/O device, where the memory access request includes an identifier of a data stream of the accelerator or the I/O device and a first physical address that the accelerator or the I/O device requests to access.

Step S602: The PAC apparatus reads, based on the identifier of the data stream of the accelerator or the I/O device, permission information corresponding to a first physical page table in which the first physical address is located, where the permission information corresponding to the first physical page table indicates whether the data stream has a read permission and/or a write permission in the first physical page table.

Optionally, before reading the permission information corresponding to the first physical page table in which the first physical address is located, the PAC apparatus may determine, based on the first physical address, a boundary range of a physical page table protection table corresponding to the data stream, and a protection granularity of the physical page table protection table, an identifier of the first physical page table in which the first physical address is located. For example, the identifier may be a physical page table number of the first physical page table.

In this embodiment of this application, the PAC apparatus may read, in the following two possible implementations, the permission information of the first physical page table in which the first physical address is located.

In a possible implementation, the PAC apparatus may determine, based on the identifier of the data stream of the accelerator or the I/O device, a physical page table protection table corresponding to the data stream of the accelerator or the I/O device, and then read, based on the identifier of the first physical page table, the permission information of the first physical page table from a physical page table protection table entry that is in the physical page table protection table and that is corresponding to the identifier of the first physical page table.

In another possible implementation, the PAC apparatus may determine, based on the identifier of the data stream of the accelerator or the I/O device, a physical page table protection table corresponding to the data stream of the accelerator or the I/O device and a protection table cache of the physical page table protection table. Then, the PAC apparatus searches for the permission information of the first physical page table in the protection table cache based on the identifier of the first physical page table. If the permission information of the first physical page table is found in the protection table cache, the permission information of the first physical page table is read from the protection table cache. Otherwise, if the permission information of the first physical page table cannot be found in the protection table cache, the permission information of the first physical page table is read from the physical page table protection table based on the identifier of the first physical page table, and the permission information of the first physical page table is loaded to the protection table cache.

Step S603: The PAC apparatus performs a permission check on the memory access request based on the permission information corresponding to the first physical page table, and if the permission check succeeds, the PAC apparatus allows the memory access request to access the first physical address. If the permission check fails, the PAC apparatus rejects the memory access request to access the first physical address.

Specifically, that the PAC apparatus performs a permission check on the memory access request based on the permission information corresponding to the first physical page table may include: If the memory access request requests to perform a read operation at the first physical address, and the permission information corresponding to the first physical page table indicates that the data stream of the accelerator or the I/O device has the read permission in the first physical page table, that is, the accelerator or the I/O device is allowed to read in the first physical page table, the permission check succeeds. Correspondingly, in this case, that the PAC apparatus allows the memory access request to access the first physical address means that the data stream of the accelerator or the I/O device is allowed to read the information stored in the first physical address, that is, a read operation is allowed to be performed at the first physical address.

If the memory access request requests to perform a read operation at the first physical address, but the permission information corresponding to the first physical page table indicates that the data stream of the accelerator or the I/O device does not have a read permission in the first physical page table, that is, the data stream of the accelerator or the I/O device cannot read in the first physical page table, the permission check fails, and the PAC apparatus should reject the memory access request to access the first physical address.

If the memory access request requests to perform a write operation at the first physical address, and the permission information corresponding to the first physical page table indicates that the data stream of the accelerator or the I/O device has a write permission in the first physical page table, that is, the data stream of the accelerator or the I/O device can write in the first physical page table, the permission check succeeds. Correspondingly, in this case, that the PAC apparatus allows the memory access request to access the first physical address means that the data stream of the accelerator or the I/O device is allowed to write new information into the first physical address, that is, a write operation is allowed to be performed at the first physical address.

If the memory access request requests to perform a write operation at the first physical address, but the permission information corresponding to the first physical page table indicates that the data stream of the accelerator or the I/O device does not have a write permission in the first physical page table, that is, the data stream of the accelerator or the I/O device cannot write in the first physical page table, the permission check fails, and the PAC apparatus should reject the memory access request to access the first physical address.

If the memory access request requests to perform a read operation and a write operation at the first physical address, and the permission information corresponding to the first physical page table indicates that the data stream of the accelerator or the I/O device has both of the read permission and the write permission in the first physical page table, that is, the data stream of the accelerator or the I/O device can read and write in the first physical page table, the permission check succeeds. Correspondingly, in this case, that the PAC apparatus allows the memory access request to access the first physical address means that the data stream of the accelerator or the I/O device is allowed to read information stored in the first physical address, and the data stream of the accelerator or the I/O device is also allowed to write new information into the first physical address, that is, a read operation and a write operation are allowed to be performed at the first physical address.

If the memory access request requests to perform a read operation and a write operation at the first physical address, but the permission information corresponding to the first physical page table indicates that the data stream of the accelerator or the I/O device does not have a read permission (that is, the data stream of the accelerator or the I/O device cannot read in the first physical page table) in the first physical page table, or if the permission information corresponding to the first physical page table indicates that the data stream of the accelerator or the I/O device does not have the write permission (that is, the data stream of the accelerator or the I/O device cannot write in the first physical page table) in the first physical page table, the permission check fails, and the PAC apparatus should reject the memory access request to access the first physical address.

Optionally, before performing step S602 of reading the permission information of the first physical page table in which the first physical address is located, the PAC apparatus may further read a protection stream table entry corresponding to a stream identifier of the data stream of the accelerator or the I/O device in the protection stream table. As described above, the protection stream table entry stores control configuration information of the data stream of the accelerator or the I/O device, and the control configuration information includes first control information for indicating whether global permission information of a physical page table protection table corresponding to the data stream is unreadable and unwritable, second control information for indicating a boundary range of the physical page table protection table, third control information for indicating a protection granularity of the physical page table protection table, fourth control information or the like that indicates whether to enable a function of checking memory access permission for the data stream.

In this way, after reading the protection stream table entry corresponding to the stream identifier of the data stream of the accelerator or the I/O device in the protection stream table, the PAC apparatus may first determine, based on an indication of the fourth control information in the protection stream table, whether the function of checking the memory access permission for the data stream is enabled. If the function is enabled, it indicates that the memory access permission needs to be checked for the data stream, and the PAC apparatus may continue a subsequent procedure of checking the memory access permission. If the function is not enabled, it indicates that the memory access permission is not checked for the data stream. In this case, the PAC apparatus may directly route the access forward.

After determining that the function of checking the memory access permission for the data stream is enabled, the PAC apparatus may determine, based on an indication of the fifth control information, whether it is necessary to control the data stream to initiate only virtual address access and not to initiate physical address access. If the fifth control information indicates that the data stream can initiate only virtual address access but cannot initiate physical address access, the PAC apparatus may directly reject the access. If the fifth control information indicates that the data stream can initiate physical address access, the PAC apparatus may continue a subsequent procedure of checking memory access permission.

Subsequently, the PAC apparatus may determine, based on an indication of the first control information, whether global permission information of the physical page table protection table corresponding to the data stream is unreadable and unwritable, and determine, based on a boundary range that is of the physical page table protection table corresponding to the data stream and that is indicated by the second control information, whether the first physical address is within the boundary range of the physical page table protection table.

If the global permission information that is of the physical page table protection table corresponding to the data stream and that is indicated by the first control information is unreadable and unwritable, it indicates that all physical page tables related to the physical page table protection table are inaccessible, that is, permission information of all physical page tables is unreadable and unwritable. Because the memory access request arrives before the physical page table protection table is initialized, the foregoing situation occurs. In this case, the PAC apparatus may directly reject the access. Similarly, if the first physical address is outside the boundary range that is of the physical page table protection table and that is indicated by the second control information, it indicates that the data stream of the accelerator or the I/O device attempts to access address space beyond a permission range of the accelerator or the I/O device, or invisible or unknown to the accelerator or the I/O device. In this case, the PAC apparatus may directly reject the access.

If the global permission information that is of the physical page table protection table corresponding to the data stream and that is indicated by the first control information is not unreadable and unwritable, and the first physical address is within the boundary range of the physical page table protection table indicated by the second control information, in this case, the PAC apparatus may read the permission information of the first physical page table in which the first physical address is located.

Optionally, before the PAC apparatus reads the permission information of the first physical page table in which the first physical address is located, the identifier of the first physical page table in which the first physical address is located may be determined based on the first physical address, the boundary range that is of the physical page table protection table corresponding to the data stream and that is indicated in the second control information, and the protection granularity that is of the physical page table protection table corresponding to the data stream and that is indicated in the third control information. For example, a physical page table number of the first physical page table is obtained, and then step S602 is performed to read the permission information of the data stream in the first physical page table from the physical page table protection table or from the protection table cache of the physical page table protection table.

Optionally, before performing step S601, the PAC apparatus may further refresh a protection table. Specifically, the PAC apparatus may receive, from a translation agent unit, the identifier of the data stream of the accelerator or the I/O device, the first physical address that the data stream requests to access, and permission information that is used by the accelerator or the I/O device to access the first physical address.

In this embodiment of this application, the translation agent unit is a functional unit configured to translate a virtual address into a corresponding physical address. The translation agent unit may receive an address translation request from the accelerator or the I/O device, where the address translation request includes the identifier of the data stream of the accelerator or the I/O device and a first virtual address that the accelerator or the I/O device requests to translate. After receiving the address translation request, the translation agent unit may translate the first virtual address into a corresponding first physical address, and then add the first physical address to an address translation result and send the address translation result to the accelerator or the I/O device. In addition, the translation agent unit may further synchronously send the address translation result to the PAC apparatus, where the address translation result includes the first physical address, and send related information such as the identifier of the data stream of the accelerator or the I/O device and the permission information for the accelerator or the I/O device to access the first physical page table in which the first physical address is located.

After receiving, from the translation agent unit, the identifier of the data stream of the accelerator or the I/O device and the first physical address that the accelerator or the I/O device requests to access, the PAC apparatus may determine, from the protection stream table based on the identifier of the data stream of the accelerator or the I/O device, the protection stream table entry corresponding to the identifier of the data stream, and may read control configuration information of the data stream from the corresponding protection stream table entry. Further, the PAC apparatus determines, based on the control configuration information of the data stream, the physical page table protection table corresponding to the data stream of the accelerator or the I/O device and the identifier of the first physical page table in which the first physical address is located.

Further, the PAC apparatus may determine whether the permission information that is of the first physical page table and that is stored in the physical page table protection table corresponding to the data stream of the accelerator or the I/O device is consistent with permission information that is received from the translation agent unit and that is used by the accelerator or the I/O device to access the first physical address, that is, determine whether the physical page table protection table corresponding to the data stream of the accelerator or the I/O device stores accurate access permission of the data stream in the first physical page table.

Specifically, if the protection table cache of the physical page table protection table corresponding to the data stream stores the permission information corresponding to the first physical page table, permission information that is corresponding to the first physical page table and that is stored in the protection table cache is inconsistent with the permission information that is received by the PAC apparatus from the translation agent unit and that is used by the accelerator or the I/O device to access the first physical address, the PAC apparatus may update, based on the permission information that is received from the translation agent unit and that is used by the accelerator or the I/O device to access the first physical address, the physical page table protection table corresponding to the data stream and the permission information that is corresponding to the first physical page table and that is stored in the protection table cache.

In other words, the PAC apparatus may consider that the permission information that is received from the translation agent unit and that is used by the accelerator or the I/O device to access the first physical address is accurate access permission of the accelerator or the I/O device in the first physical page table. If the permission information stored in the physical page table protection table and the protection table cache corresponding to the data stream is inconsistent with access permission, the PAC apparatus refreshes, by using the accurate permission information received from the translation agent unit, the permission information that is of the first physical page table and that is stored in the physical page table protection table and the protection table cache. Therefore, it is ensured that the PAC apparatus uses accurate permission information when checking the memory access permission by using the permission information stored in the physical page table protection table or the protection table cache.

If the protection table cache of the physical page table protection table corresponding to the data stream stores the permission information corresponding to the first physical page table, and if the permission information that is corresponding to the first physical page table and that is stored in the protection table cache is consistent with the permission information that is received by the PAC apparatus from the translation agent unit and that is used by the accelerator or the I/O device to access the first physical address, the PAC apparatus may not need to do anything.

If the protection table cache of the physical page table protection table corresponding to the data stream does not store the permission information corresponding to the first physical page table, the PAC apparatus may use, as the permission information corresponding to the first physical page table, the permission information that is received from the translation agent unit and that is used by the accelerator or the I/O device to access the first physical address, separately writes the permission information that is received from the translation agent unit and that is for the accelerator or the I/O device to access the first physical address into the physical page table protection table corresponding to the data stream and/or the protection table cache of the physical page table protection table.

Specifically, the PAC apparatus may create a new physical page table protection table entry in the physical page table protection table corresponding to the data stream, and establish a mapping relationship between the physical page table protection table entry and the identifier of the first physical page table, and then stores permission information that is used by the accelerator or the I/O device to access the first physical address accessed in the physical page table protection table entry. A method for writing, by the PAC apparatus, the permission information that is used by the accelerator or the I/O device to access the first physical address into the protection table cache is similar to this, and details are not described again.

Optionally, in a running procedure of the accelerator or the I/O device, a related physical page table may be updated. For example, there may be a new physical page table to be established, or a mapping between a virtual address and a physical address changes. In this case, the system software may invalidate some physical page tables, or invalidate all physical page tables related to a process in the accelerator or the I/O device, or may even invalidate all physical page tables related to the accelerator or the I/O device. In either case, the page table management module in the system software learns of specific physical page tables that are invalidated, and sends information about the invalidated physical page tables to the PAC apparatus, so that the PAC apparatus performs corresponding processing, including refreshing the control configuration information that is corresponding to the data stream of the accelerator or the I/O device and that is stored in the protection stream table, permission information that is of the invalidated physical page table and that is stored in the physical page table protection table, and the like.

Specifically, in a possible implementation, the PAC apparatus may receive page table invalidation information from a page table management module, where the page table invalidation information includes the identifier of the data stream of the accelerator or the I/O device and identifiers of one or more invalid physical page tables. Further, the PAC apparatus may update the physical page table protection table corresponding to the data stream and permission information corresponding to the one or more invalid physical page tables in the protection table cache, to unreadable and unwritable.

In another possible implementation, the PAC apparatus may receive page table invalidation information from a page table management module, where the page table invalidation information includes the identifier of the data stream of the accelerator or the I/O device and indication information for performing global invalidation on a physical page table related to the data stream. Further, the PAC apparatus may set the global permission information that is of the physical page table protection table and that is corresponding to the data stream in the protection stream table, to unreadable and unwritable. If a quantity of physical page tables related to the data stream is small, the PAC apparatus may also select to traverse the physical page table protection table corresponding to the data stream and/or the physical page table in the protection table cache, and set permission information of each physical page table to be unreadable and unwritable one by one. This is not limited in this application. This implementation may be referred to as global invalidation based on a stream identifier (stream ID).

In still another possible implementation, the PAC apparatus may receive page table invalidation information from a page table management module, where the page table invalidation information includes the identifier of the data stream of the accelerator or the I/O device, and an identifier of a sub data stream of a process in the accelerator or the I/O device, and indication information for performing global invalidation on a physical page table related to the sub data stream. In this scenario, if the protection stream table is a process-level protection stream table, a sub data stream of each process in the accelerator or the I/O device has a corresponding physical page table protection table, the PAC apparatus may set the global permission information of the physical page table protection table corresponding to the sub data stream in a sub protection stream table of the data stream, to unreadable and unwritable. Alternatively, if a quantity of physical page tables related to the sub data stream is small, the PAC apparatus may also select to traverse the physical page table protection table and/or the physical page table in the protection table cache corresponding to the sub data stream, and may set permission information of each physical page table to be unreadable and unwritable one by one. This implementation may be referred to as global invalidation based on a sub stream identifier (sub-stream ID).

It should be noted that, in this embodiment of this application, the physical page table protection table and the protection table cache in the PAC apparatus may be automatically maintained and refreshed in a hardware manner. However, it should be noted that in this manner, the accelerator or the I/O device needs to support an address translation service (ATS) mechanism or another similar mechanism, for example, a distributed translation interface (DTI) mechanism in an ARM architecture. The ATS mechanism means that the accelerator or the I/O device applies to a system translation agent (TA) for physical address space corresponding to virtual address space by carrying information such as an identifier of a data stream and an identifier of a sub data stream (if necessary) of the accelerator or the I/O device, and a start address and a space size of the virtual address space, to obtain information such as corresponding address space and related address space before the accelerator or the I/O device accesses the system memory.

Figure 7:
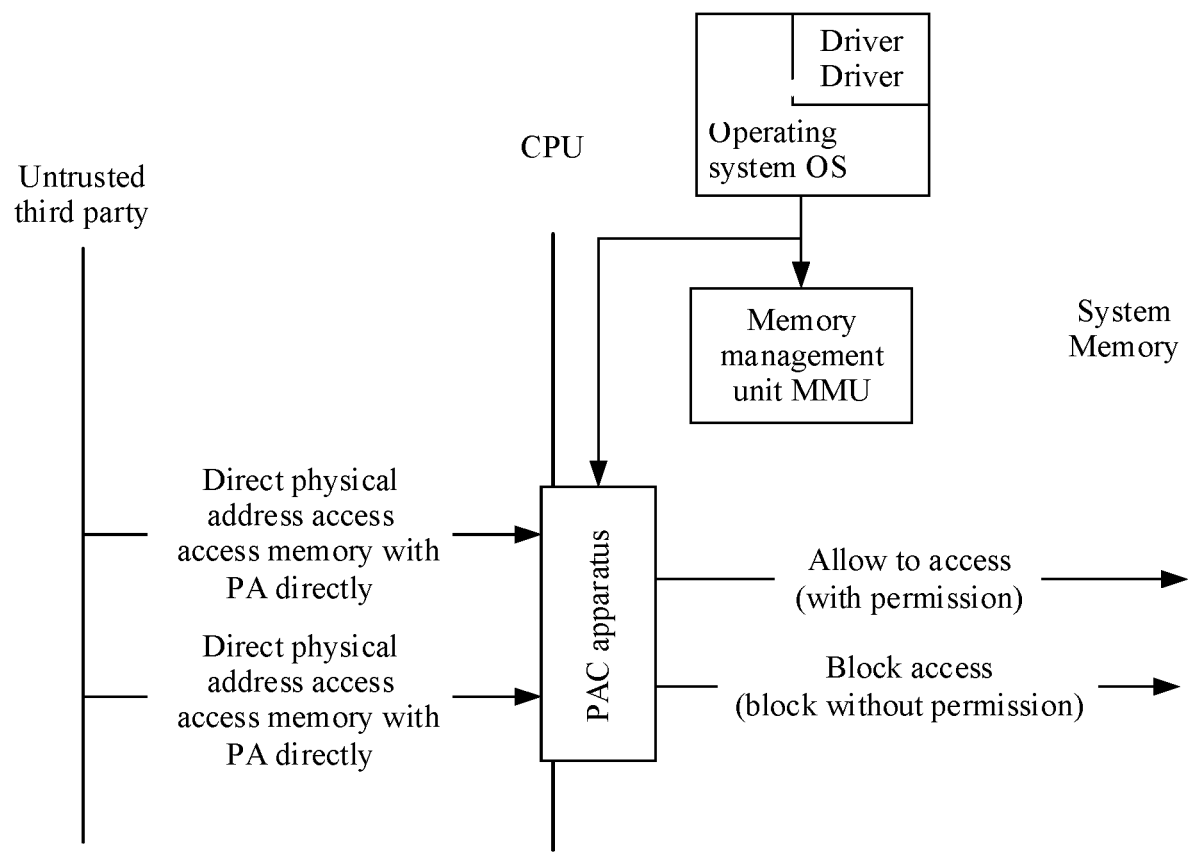
FIG. 7 is a schematic diagram in which system software directly controls a PAC apparatus according to an embodiment of this application.

Alternatively, the physical page table protection table and the protection table cache in the PAC apparatus may be maintained and refreshed by system software in a software manner. Refer to FIG. 7. Specifically, system software (for example, an operating system (OS)) may directly control the PAC apparatus, and before a driver corresponding to the accelerator or the I/O device starts service working, the system software allocates a related resource to the accelerator or the I/O device, establishes a corresponding protection stream table entry in the protection stream table, and sets control configuration information. In addition, the system software further establishes, in the PAC apparatus, a physical page table protection table corresponding to the accelerator or the I/O device, and configures access permission of a related physical address in the corresponding physical page table protection table.

The following describes in detail, by using flowcharts in FIG. 8a to FIG. 8d, an overall procedure related to a memory protection method provided in an embodiment of this application.

1. Initialization

Figure 8A:
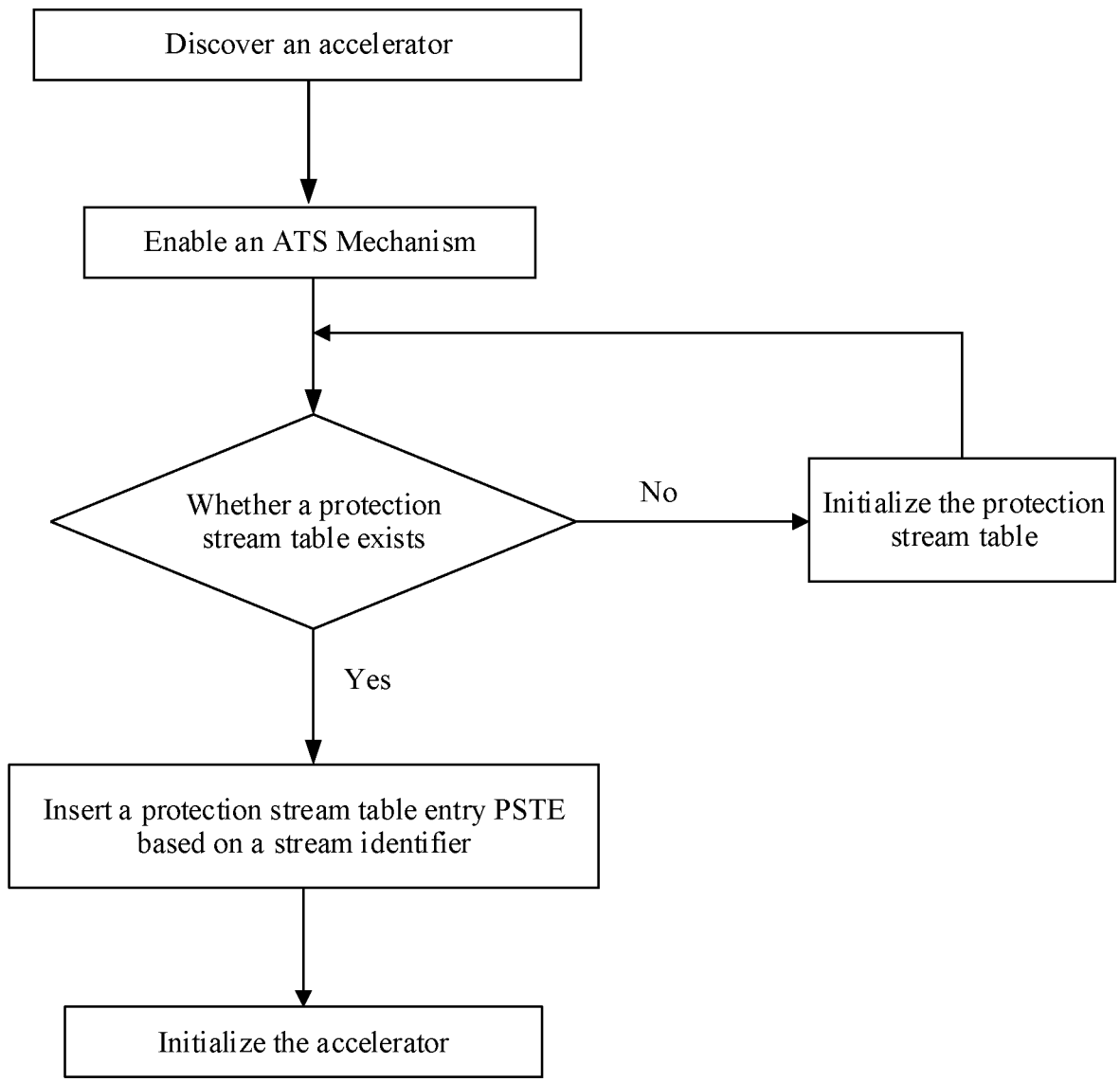
FIG. 8a to FIG. 8d are schematic diagrams of an overall procedure related to a memory protection method according to an embodiment of this application.

Refer to FIG. 8a. First, system management software discovers an accelerator/I/O device, and system software enables an ATS mechanism. The system software establishes a corresponding protection stream table entry for the accelerator/I/O device based on a stream identifier or a device identifier (for example, a stream ID or a requester ID) of the accelerator/I/O device, and initializes the protection stream table entry. Then the system software starts the accelerator, and starts to work.

During initialization, the system software does not need to traverse an entire physical page table protection table, and sets permission bits of each physical page table to 00b (indicating that there is no read permission or write permission) one by one. Instead, when the protection stream table entry corresponding to the accelerator/I/O device is initialized, a Zero bit in the protection stream table entry may be set to 1, and it indicates that the accelerator/I/O device corresponding to the stream identifier has no read permission or write permission. In other words, global permission of a physical page table protection table corresponding to the accelerator/I/O device is unreadable and unwritable.

The system software may further set, during initialization, other control configuration information such as a base address and a boundary size that are of the physical page table protection table corresponding to the accelerator/I/O device in a memory.

2. Refreshing a Protection Table

Figure 8B:
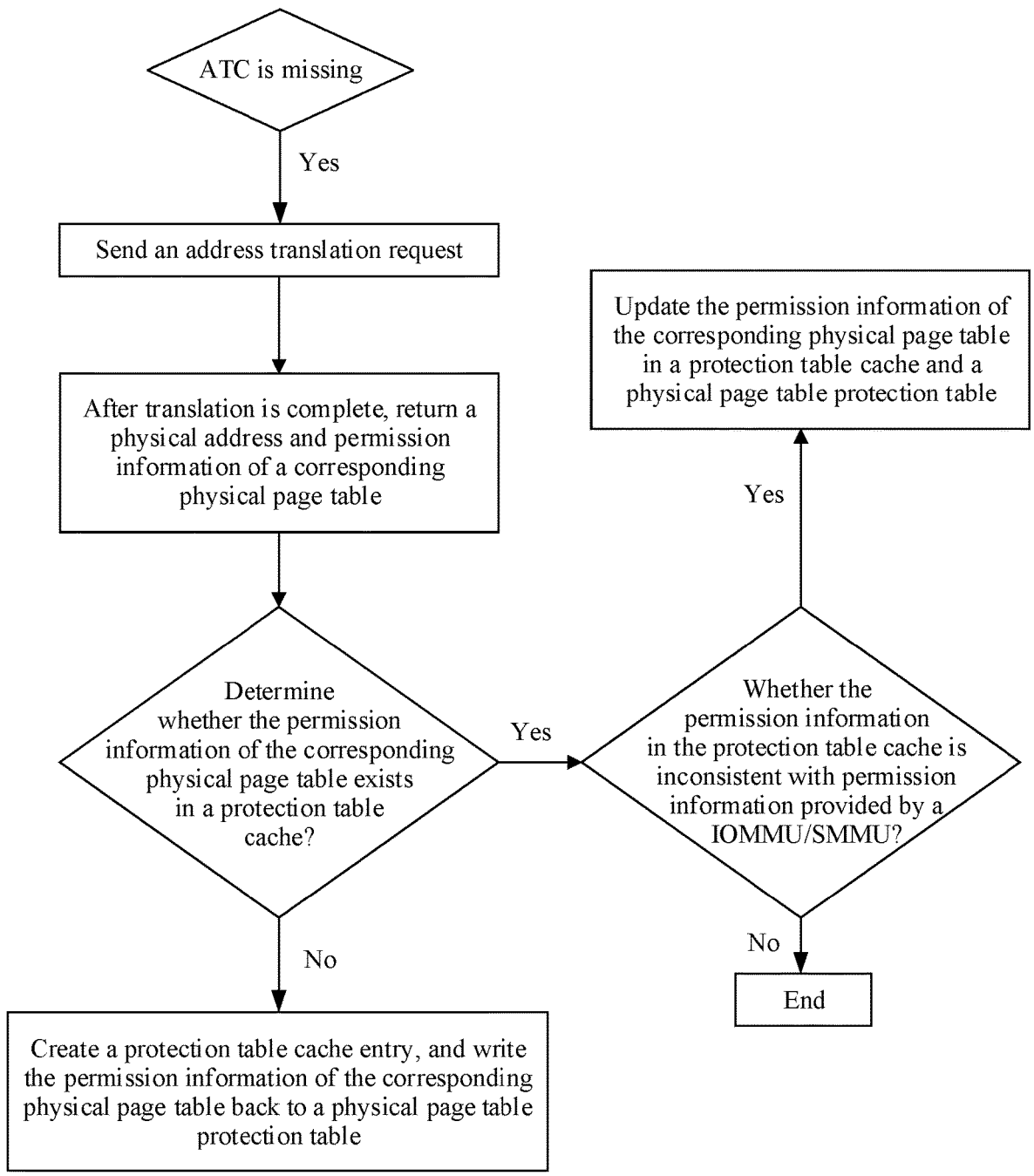

Refer to FIG. 8b. When a local ATC of the accelerator/I/O device is missing, the accelerator/I/O device may request, by using the ATS mechanism, an IOMMU/SMMU to perform address translation. After the address translation is completed, the IOMMU/SMMU may return a corresponding address translation result to the accelerator/I/O device. In addition, the IOMMU/SMMU may further synchronously send the address translation result and related information to a PAC apparatus in this application. The address translation result includes a physical address of address space that the accelerator/I/O device requests to access, and the related information may include a stream identifier of the accelerator/I/O device and permission information of a corresponding physical page table.

Subsequently, the PAC apparatus may determine whether a local protection table cache corresponding to the stream identifier of the accelerator/I/O device has corresponding access permission. If the permission information corresponding to the physical page table exists in the protection table cache, and the permission information in the protection table cache is consistent with the permission information provided by the IOMMU/SMMU, the PAC apparatus does not need to do anything. If the permission information corresponding to the physical page table exists in the protection table cache, but the permission information in the protection table cache is inconsistent with the permission information provided by the IOMMU/SMMU, the PAC apparatus refreshes the permission information corresponding to the physical page table in the protection table cache, and writes the permission information back to a corresponding physical page table protection table (PPPT). If the permission information corresponding to the physical page table does not exist in the protection table cache, the PAC apparatus establishes an entry cache corresponding to a physical page table in the protection table cache, and writes the permission information of the physical page table into the corresponding physical page table protection table.

3. Memory Access

Figure 8C:
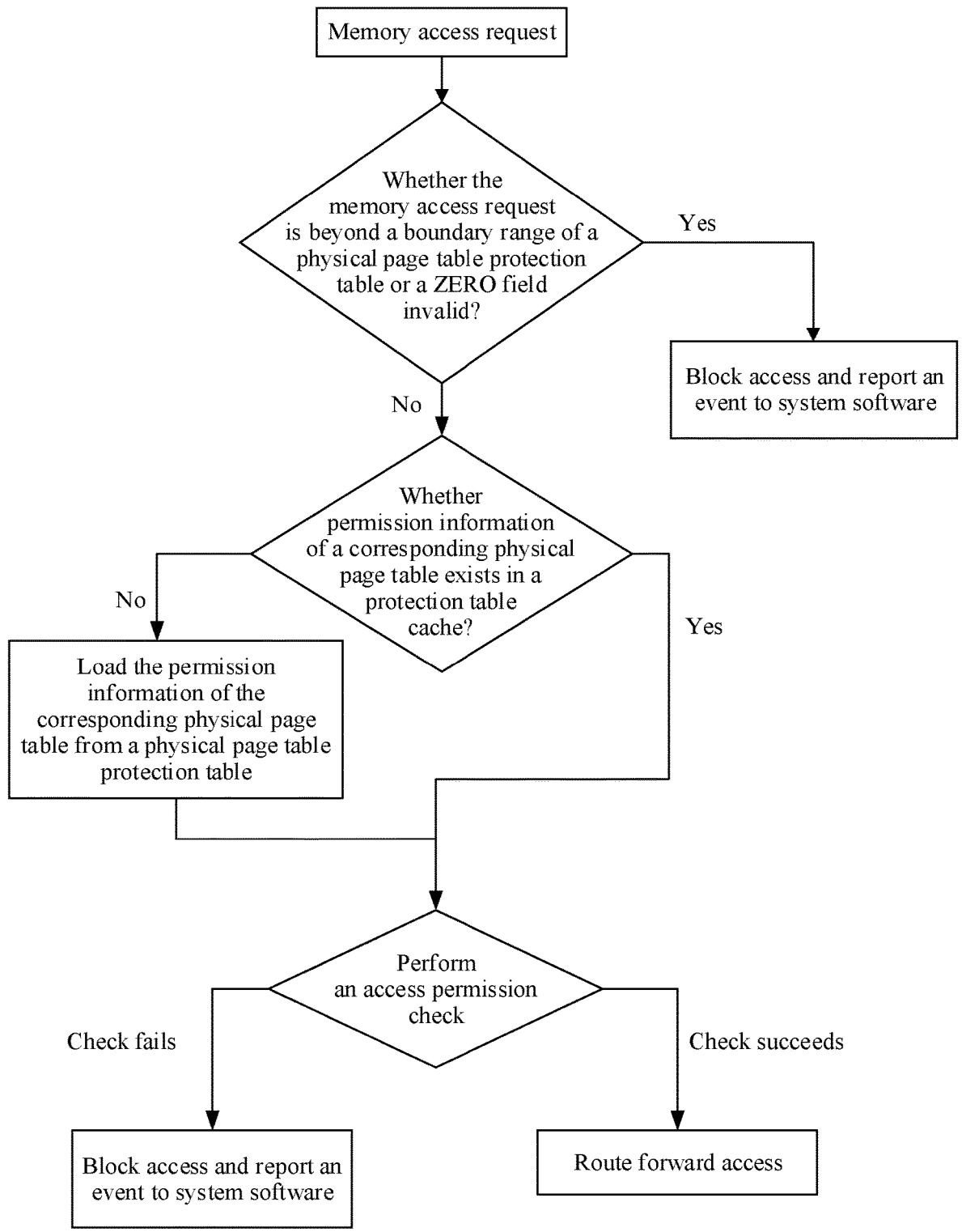

Refer to FIG. 8c. After obtaining the physical address, the accelerator/I/O device initiates memory access. In this case, access permission check is performed on all memory access requests by using the PAC apparatus in this application. In this case, if it is found that a check switch bit in a protection table stream table entry corresponding to a stream that is accessed this time is not enabled (that is, an EN field indicates that access permission is not checked), the access is directly routed forward. Otherwise, if the access request for accessing a system memory by the accelerator/I/O device by using the physical address arrives before the physical page table protection table is initialized (that is, a ZERO field indicates that the global permission information is unreadable and unwritable, or it is considered that the ZERO field is invalid), if a granularity-aligned value of the physical address to be accessed is aligned is greater than a boundary range of the physical page table protection table, the access is directly blocked, and an event is reported to the system software. Otherwise, it is determined whether the protection table cache in the PAC apparatus has permission information of the corresponding physical page table. If the protection table cache in the PAC apparatus does not have the permission information of the corresponding physical page table, the permission information of the corresponding physical page table is loaded from the physical page table protection table to the protection table cache, and then permission check is performed. Otherwise, the permission information of the corresponding physical page table in the protection table cache is directly read for permission check. If the permission check succeeds, the access can be routed forward. Otherwise, the access is blocked, and an event is reported to the software.

4. Invalidation of a Protection Table

Figure 8D:
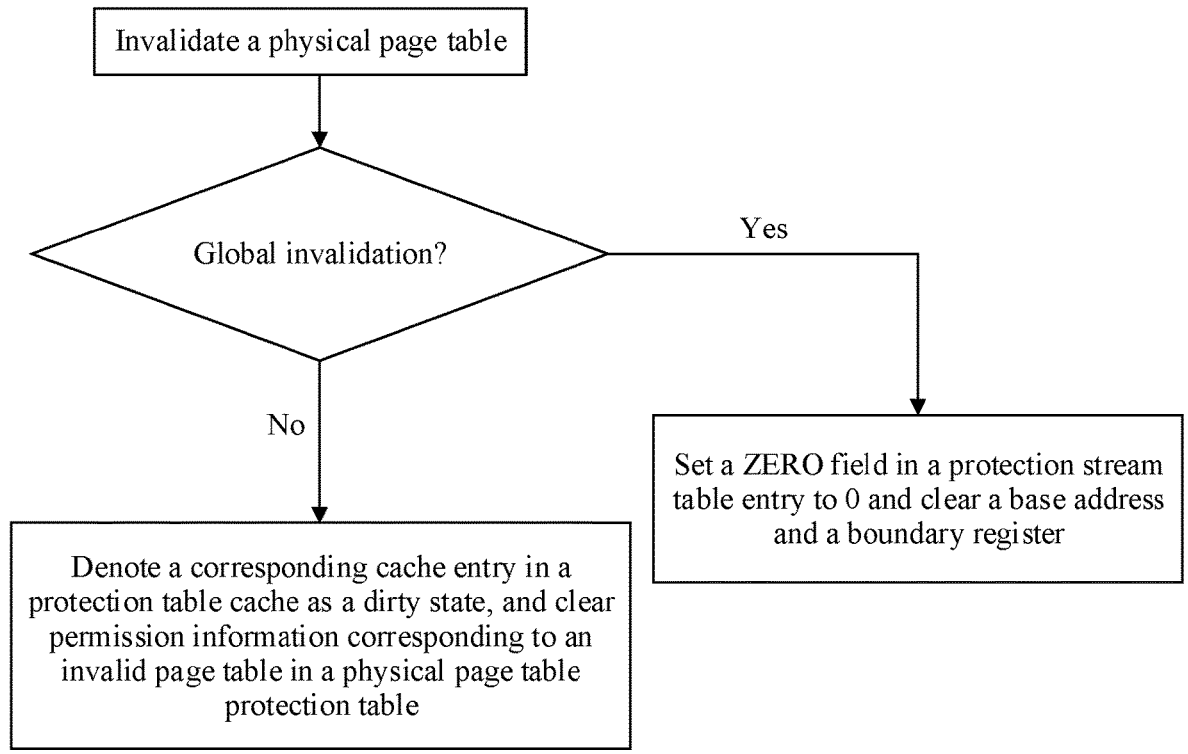

Refer to FIG. 8d. In an ongoing procedure of a process, a corresponding physical page table may be updated. If a new physical page table needs to be established or a previous mapping between a virtual address and a physical address is changed, the PAC apparatus in this application also needs to perform corresponding processing. In this case, the system software may choose to invalidate some page table mappings or invalidate all page tables that belong to the process. In either case, a page table management module of the system needs to learn of which page tables in a specific physical page table need to be invalidated. In this case, information is synchronized to the PAC apparatus. Then, the PAC apparatus may denote a cache entry corresponding to an invalid page table in the protection table cache as a dirty state, and refresh permission information of the related invalid page table in the physical page table protection table, and refresh a corresponding protection stream table entry or sub protection stream table entry in the protection stream table.

Alternatively, the invalidation may be global invalidation based on a sub stream ID, or global invalidation based on a stream ID. The global invalidation based on the sub stream ID means that an invalidation operation affects all related physical page tables under the sub stream ID. The global invalidation based on the stream ID means that an invalidation operation affects all related physical page tables under the stream ID.

Figure 9:
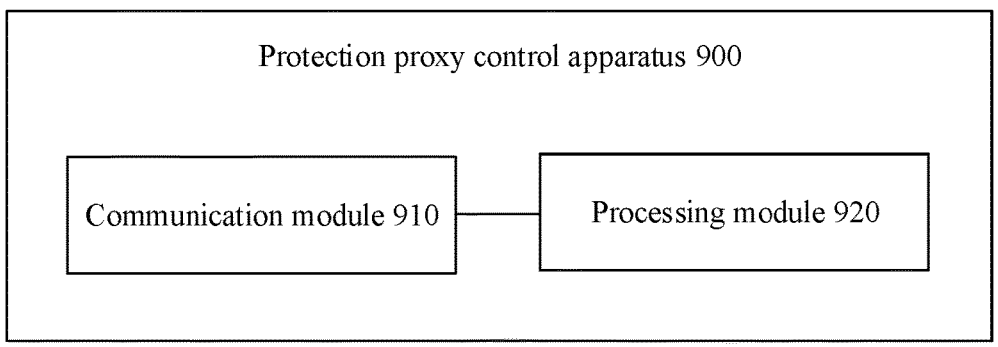
FIG. 9 is another schematic diagram of a structure of a protection proxy control apparatus according to an embodiment of this application.

An embodiment of this application further provides a protection proxy control apparatus. FIG. 9 is a schematic diagram of a structure of the protection proxy control apparatus according to an embodiment of this application. A protection proxy control apparatus 900 includes a communication module 910 and a processing module 920. The protection proxy control apparatus may be configured to implement any one of the foregoing method embodiments.

For example, when the protection proxy control apparatus performs the method embodiment shown in FIG. 6, the communication module 910 is configured to receive a memory access request from an accelerator or an input/output I/O device, where the memory access request includes an identifier of a data stream of the accelerator or the I/O device and a first physical address requested to be accessed. The processing module 920 is configured to read, based on the identifier of the data stream of the accelerator or the I/O device, permission information corresponding to a first physical page table in which the first physical address is located, where the permission information corresponding to the first physical page table indicates whether the data stream has a read permission and/or a write permission in the first physical page table. The processing module 920 is further configured to: perform a permission check on the memory access request based on the permission information corresponding to the first physical page table, and if the permission check succeeds, allow the memory access request to access the first physical address.

The processing module 920 in the protection proxy control apparatus may be implemented by a processor or a circuit component related to the processor, and the communication module 910 may be implemented by a transceiver or a circuit component related to the transceiver. Operations and/or functions of the modules in the protection proxy control apparatus are separately used to implement corresponding procedures of the method shown in FIG. 6, FIG. 7, FIG. 8a, FIG. 8b, FIG. 8c, or FIG. 8d. For brevity, details are not described herein again.

An embodiment of this application further provides a chip system, including a processor, where the processor is coupled to a memory. The memory is configured to store a program or instructions. When the program or the instructions are executed by the processor, the chip system is enabled to implement the method according to any one of the foregoing method embodiments.

Optionally, there may be one or more processors in the chip system. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory.

Optionally, there may also be one or more memories in the chip system. The memory may be integrated with the processor, or may be disposed separately from the processor. This is not limited in this application. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in this application.

For example, the chip system may be a field programmable gate array (FPGA), an application-specific integrated circuit (ASIC), a system on a chip (SoC), a central processing unit (CPU), a network processor (NP), a digital signal processor (DSP), a microcontroller unit (MCU), a programmable logic device (PLD), or another integrated chip.

It should be understood that steps in the foregoing method embodiments may be implemented by using a logic circuit or instructions in a software form in the processor. The steps of the methods disclosed with reference to embodiments of this application may be directly performed by a hardware processor, or may be performed by a combination of hardware in the processor and a software module.

An embodiment of this application further provides a computer-readable storage medium. The computer storage medium stores computer-readable instructions. When a computer reads and executes the computer-readable instructions, the computer is enabled to perform the method according to any one of the foregoing method embodiments.

An embodiment of this application further provides a computer program product. When a computer reads and executes the computer program product, the computer is enabled to perform the method according to any one of the foregoing method embodiments.

An embodiment of this application provides a computer system. The computer system includes the protection proxy control apparatus described in this application, a CPU coupled to the protection proxy control apparatus, and at least one third-party accelerator or I/O device.

It should be understood that, the processor in embodiments of this application may be a CPU, or may be another general-purpose processor, a DSP, an ASIC, an FPGA or another programmable logic device, a discrete gate or a transistor logic device, a discrete hardware component, or the like. The general-purpose processor may be a microprocessor, or the processor may be any conventional processor or the like.

It may be understood that the memory mentioned in embodiments of this application may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM).

It should be noted that when the processor is a general-purpose processor, a DSP, an ASIC, an FPGA or another programmable logic device, a discrete gate, a transistor logic device, or a discrete hardware component, the memory (a storage module) is integrated into the processor.

It should be noted that the memory described in this specification aims to include but is not limited to these memories and any memory of another proper type.

It should be understood that numbers in various embodiments of this application are merely used for differentiation for ease of description. Sequence numbers of the foregoing processes do not mean execution sequences. The execution sequences of the processes should be determined based on functions and internal logic of the processes, and should not be construed as any limitation on the implementation processes of embodiments of this application.

In embodiments of this application, unless otherwise stated or there is a logical conflict, terms and/or descriptions between different embodiments are consistent and may be mutually referenced, and technical features in different embodiments may be combined based on an internal logical relationship thereof, to form a new embodiment.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each unit may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for memory protection, wherein the method comprises:
   receiving, by a protection agent control (PAC) apparatus different from an address translation service (ATS) module, a memory access request from an accelerator or an input/output (I/O) device, wherein the memory access request comprises an identifier of a data stream of the accelerator or the I/O device and a first physical address requested to be accessed;
   reading, by the PAC apparatus, based on the identifier of the data stream of the accelerator or the I/O device, permission information corresponding to a first physical page table in which the first physical address is located, wherein the permission information corresponding to the first physical page table indicates whether the data stream has at least one of a read permission or a write permission in the first physical page table; and
   performing, by the PAC apparatus, a permission check on the memory access request based on the permission information corresponding to the first physical page table, and in response to determining that the permission check succeeds, allowing the memory access request to access the first physical address.

2. The method according to claim 1, wherein the reading, based on the identifier of the data stream of the accelerator or the IO device, permission information corresponding to a first physical page table in which the first physical address is located comprises:
   determining, based on the identifier of the data stream of the accelerator or the I/O device, a physical page table protection table and a protection table cache that correspond to the data stream, wherein the physical page table protection table stores permission information corresponding to at least one physical page table, and the protection table cache is a cache of the physical page table protection table;
   determining, based on an identifier of the first physical page table, whether the permission information corresponding to the first physical page table exists in the protection table cache, and in response to determining that the permission information corresponding to the first physical page table exists in the protection table cache, reading the permission information corresponding to the first physical page table from the protection table cache; and
   in response to determining that the permission information corresponding to the first physical page table does not exist, reading the permission information corresponding to the first physical page table from the physical page table protection table, and loading the permission information corresponding to the first physical page table to the protection table cache.

3. The method according to claim 2, wherein one entry of the protection table cache stores permission information corresponding to one or more physical page tables, and an entry that is in the protection table cache and in which permission information corresponding to each physical page table is located is indexed based on a hash value of an identifier of the physical page table.

4. The method according to claim 1, wherein the reading, based on the identifier of the data stream of the accelerator or the I/O device, permission information corresponding to a first physical page table in which the first physical address is located comprises:
- determining, based on the identifier of the data stream of the accelerator or the I/O device, a physical page table protection table corresponding to the data stream, wherein the physical page table protection table stores permission information corresponding to at least one physical page table; and
- reading, from the physical page table protection table based on an identifier of the first physical page table, the permission information corresponding to the first physical page table.

5. The method according to claim 1, wherein before the reading, based on the identifier of the data stream of the accelerator or the I/O device, permission information corresponding to a first physical page table in which the first physical address is located, the method further comprises:
- reading a protection stream table entry corresponding to a stream identifier of the data stream of the accelerator or the I/O device in a protection stream table, wherein the protection stream table entry comprises first control information and second control information, the first control information indicates whether global permission information of the physical page table protection table corresponding to the data stream is unreadable and unwritable, and the second control information indicates a boundary range of the physical page table protection table; and
- in response to determining, based on the first control information and the second control information, that the global permission information of the physical page table protection table is not unreadable and unwritable, and the first physical address is within the boundary range of the physical page table protection table, reading the permission information corresponding to the first physical page table in which the first physical address is located.

6. The method according to claim 5, wherein the protection stream table entry further comprises third control information, and the third control information indicates a protection granularity of the physical page table protection table; and
- before the reading the permission information corresponding to the first physical page table in which the first physical address is located, the method further comprises:
- determining, based on the boundary range and the protection granularity of the physical page table protection table, the first physical page table in which the first physical address is located.

7. The method according to claim 5, wherein the protection stream table entry further comprises fourth control information, and the fourth control information indicates whether to enable a function of checking memory access permission for the data stream; and
- after reading the protection stream table entry corresponding to the stream identifier of the data stream of the accelerator or the I/O device in the protection stream table, the method further comprises:
- determining, based on the fourth control information, that the function of checking the memory access permission for the data stream is enabled.

8. The method according to claim 2, wherein the method further comprises:
- receiving, from a translation agent unit, the identifier of the data stream of the accelerator or the I/O device, the first physical address, and permission information that is used by the accelerator or the I/O device to access the first physical address; and
- in response to determining that the permission information corresponding to the first physical page table in which the first physical address is located exists in the protection table cache corresponding to the data stream, and the permission information that is corresponding to the first physical page table and that is in the protection table cache is inconsistent with the permission information that is received from the translation agent unit and that is used by the accelerator or the I/O device to access the first physical address, updating, based on the permission information that is received from the translation agent unit and that is used by the accelerator or the I/O device to access the first physical address, the physical page table protection table corresponding to the data stream and the permission information that is corresponding to the first physical page table and that is in the protection table cache.

9. The method according to claim 8, wherein the method further comprises:
- in response to determining that the permission information corresponding to the first physical page table in which the first physical address is located does not exist in the protection table cache corresponding to the data stream, using, as the permission information corresponding to the first physical page table in which the first physical address is located, the permission information that is received from the translation agent unit and that is used by the accelerator or the I/O device to access the first physical address, and writing the permission information that is received from the translation agent unit and that is used by the accelerator or the I/O device to access the first physical address separately into the physical page table protection table corresponding to the data stream and/or the protection table cache corresponding to the data stream.

10. An apparatus for protection proxy control, wherein the apparatus is different from an address translation service (ATS) module and comprises at least one processor;
- a communication interface; and
- one or more memories coupled to the at least one processor and storing programming instructions for execution by the at least one processor to cause the apparatus to:
- receive, through the communication interface, a memory access request from an accelerator or an input/output (I/O) device, wherein the memory access request comprises an identifier of a data stream of the accelerator or the I/O device and a first physical address requested to be accessed;
- read, based on the identifier of the data stream of the accelerator or the I/O device, permission information corresponding to a first physical page table in which the first physical address is located, wherein the permission information corresponding to the first physical page table indicates whether the data stream has at least one of a read permission or a write permission in the first physical page table; and
- perform a permission check on the memory access request based on the permission information corresponding to the first physical page table, and in response to determining that the permission check succeeds, allow the memory access request to access the first physical address.

11. The apparatus according to claim 10, wherein programming instructions are for execution by the at least one processor to cause the apparatus to:
  determine, based on the identifier of the data stream of the accelerator or the I/O device, a physical page table protection table and a protection table cache that correspond to the data stream, wherein the physical page table protection table stores permission information corresponding to at least one physical page table, and the protection table cache is a cache of the physical page table protection table;
  determine, based on an identifier of the first physical page table, whether the permission information corresponding to the first physical page table exists in the protection table cache, and in response to determining that the permission information corresponding to the first physical page table exists in the protection table cache, read the permission information corresponding to the first physical page table from the protection table cache; and
  in response to determining that the permission information corresponding to the first physical page table does not exist, read the permission information corresponding to the first physical page table from the physical page table protection table, and load the permission information corresponding to the first physical page table to the protection table cache.

12. The apparatus according to claim 11, wherein one entry of the protection table cache stores permission information corresponding to one or more physical page tables, and an entry that is in the protection table cache and in which permission information corresponding to each physical page table is located is indexed based on a hash value of an identifier of the physical page table.

13. The apparatus according to claim 10, wherein the programming instructions are for execution by the at least one processor to cause the apparatus to:
  determine, based on the identifier of the data stream of the accelerator or the I/O device, a physical page table protection table corresponding to the data stream, wherein the physical page table protection table stores permission information corresponding to at least one physical page table; and
  read, from the physical page table protection table based on an identifier of the first physical page table, the permission information corresponding to the first physical page table.

14. The apparatus according to claim 10, wherein the programming instructions are for execution by the at least one processor to cause the apparatus to:
  reading a protection stream table entry corresponding to a stream identifier of the data stream of the accelerator or the I/O device in a protection stream table, wherein the protection stream table entry comprises first control information and second control information, the first control information indicates whether global permission information of the physical page table protection table corresponding to the data stream is unreadable and unwritable, and the second control information indicates a boundary range of the physical page table protection table; and
  in response to determining it is determined, based on the first control information and the second control information, that the global permission information of the physical page table protection table is not unreadable and unwritable, and the first physical address is within the boundary range of the physical page table protection table, read the permission information corresponding to the first physical page table in which the first physical address is located.

15. The apparatus according to claim 14, wherein the protection stream table entry further comprises third control information, and the third control information indicates a protection granularity of the physical page table protection table; and
  the programming instructions are for execution by the at least one processor to cause the apparatus to determine, based on the boundary range and the protection granularity of the physical page table protection table, the first physical page table in which the first physical address is located.

16. The apparatus according to claim 14, wherein the protection stream table entry further comprises fourth control information, and the fourth control information indicates whether to enable a function of checking memory access permission for the data stream; and
  the programming instructions are for execution by the at least one processor to cause the apparatus to determine, based on the fourth control information, that the function of checking memory access permission for the data stream is enabled.

17. The apparatus according to claim 11, wherein the programming instructions are for execution by the at least one processor to cause the apparatus to:
  receive, through the communication interface, from a translation agent unit, the identifier of the data stream of the accelerator or the I/O device, the first physical address, and permission information that is used by the accelerator or the I/O device to access the first physical address; and
  in response to determining that the permission information corresponding to the first physical page table in which the first physical address is located exists in the protection table cache corresponding to the data stream, and the permission information that is corresponding to the first physical page table and that is in the protection table cache is inconsistent with the permission information that is received from the translation agent unit and that is used by the accelerator or the I/O device to access the first physical address, update, based on the permission information that is received from the translation agent unit and that is used by the accelerator or the I/O device to access the first physical address, the physical page table protection table corresponding to the data stream and the permission information that is corresponding to the first physical page table and that is in the protection table cache.

18. The apparatus according to claim 17, wherein the programming instructions are for execution by the at least one processor to cause the apparatus to:
  in response to determining that the permission information corresponding to the first physical page table in which the first physical address is located does not exist in the protection table cache corresponding to the data stream, use, as the permission information corresponding to the first physical page table in which the first physical address is located, permission information that is received from the translation agent unit and that is used by the accelerator or the I/O device to access the first physical address, and write permission information that is received from the translation agent unit and that is used by the accelerator or the I/O device to access the first physical address separately into the physical page table protection table corresponding to the data stream and/or the protection table cache corresponding to the data stream.

19. A non-transitory computer-readable storage medium, wherein the non-transitory computer-readable storage medium stores programming instructions for execution by a computer to cause the computer to:

receive a memory access request from an accelerator or an input/output (I/O) device, wherein the memory access request comprises an identifier of a data stream of the accelerator or the I/O device and a first physical address requested to be accessed, wherein the computer is different from an address translation service (ATS) module;

read, based on the identifier of the data stream of the accelerator or the I/O device, permission information corresponding to a first physical page table in which the first physical address is located, wherein the permission information corresponding to the first physical page table indicates whether the data stream has at least one of a read permission or a write permission in the first physical page table; and perform a permission check on the memory access request based on the permission information corresponding to the first physical page table, and in response to determining that the permission check succeeds, allow the memory access request to access the first physical address.

20. A computer program product, wherein the computer program product comprises a non-transitory computer-readable storage medium storing programming instructions for execution by a computer to cause the computer to:

receive a memory access request from an accelerator or an input/output wherein the memory access request comprises an identifier of a data stream of the accelerator or the I/O device and a first physical address requested to be accessed, wherein the computer is different from an address translation service (ATS) module;

read, based on the identifier of the data stream of the accelerator or the I/O device, permission information corresponding to a first physical page table in which the first physical address is located, wherein the permission information corresponding to the first physical page table indicates whether the data stream has at least one of a read permission or a write permission in the first physical page table; and perform a permission check on the memory access request based on the permission information corresponding to the first physical page table, and in response to determining that the permission check succeeds, allow the memory access request to access the first physical address.

* * * * *

UNITED STATES PATENT AND TRADEMARK OFFICE
CERTIFICATE OF CORRECTION

| | | |
|---|---|---|
| PATENT NO. | : 12,399,841 B2 | Page 1 of 1 |
| APPLICATION NO. | : 18/162114 | |
| DATED | : August 26, 2025 | |
| INVENTOR(S) | : Junlong Liu | |

It is certified that error appears in the above-identified patent and that said Letters Patent is hereby corrected as shown below:

On the Title Page

In Column 2 (item (56) Other Publications), In Line 1, Delete "AppIn" and insert -- Appln --.

In the Claims

In Column 30, In Line 32, In Claim 2, delete "IO" and insert -- I/O --.

In Column 31, In Line 1, In Claim 4, delete "the/O" and insert -- the I/O --.

In Column 36, In Line 7 (Approx.), In Claim 20, after "input/output" insert -- (I/O) device, --.

Signed and Sealed this
Thirtieth Day of December, 2025

John A. Squires
*Director of the United States Patent and Trademark Office*